United States Patent [19]
Morikita

[11] Patent Number: 6,003,339
[45] Date of Patent: Dec. 21, 1999

[54] GLASS COMPRESSION MOLDING MACHINE AND MACHINING CHAMBER THEREFOR

[75] Inventor: Nobuo Morikita, Chiba, Japan

[73] Assignee: Sumitomo Heavy Industries, Ltd., Japan

[21] Appl. No.: 08/069,273

[22] Filed: May 28, 1993

[30] Foreign Application Priority Data

| Jun. 2, 1992 | [JP] | Japan | 4-141379 |
| Jun. 2, 1992 | [JP] | Japan | 4-141380 |
| May 14, 1993 | [JP] | Japan | 5-112753 |

[51] Int. Cl.$^6$ .......................... C03B 23/00; C03B 23/04; C03B 23/20; A01J 21/00
[52] U.S. Cl. .................. 65/275; 65/268; 65/269; 65/157; 425/414; 425/416; 425/423
[58] Field of Search .................. 65/157, 268, 275, 65/269, 319, 306, 355, 361, 362, 32.1, 317, 305; 425/210, 815, 406, 407, 808, 405.1, 410, 412, 414, 416, 423

[56] References Cited

U.S. PATENT DOCUMENTS

| 2,410,616 | 11/1946 | Webb | 65/157 |
| 2,888,316 | 5/1959 | Anderson | 65/355 |
| 3,244,497 | 4/1966 | Copeland | 65/319 |
| 3,844,755 | 10/1974 | Angle et al. | 65/157 |
| 4,397,669 | 8/1983 | Haisma et al. | 65/319 |
| 4,778,505 | 10/1988 | Hirota et al. | 65/268 |
| 4,854,958 | 8/1989 | Marechal et al. | 65/275 |
| 5,032,159 | 7/1991 | Kuwabara et al. | 65/268 |
| 5,120,343 | 6/1992 | Monji et al. | 65/268 |
| 5,173,100 | 12/1992 | Shigyo et al. | 425/808 |
| 5,250,099 | 10/1993 | Kubo et al. | 65/275 |

FOREIGN PATENT DOCUMENTS

| 63-222021 | 9/1988 | Japan | 65/157 |
| 63-295449 | 12/1988 | Japan | 65/319 |
| 1-157423 | 6/1989 | Japan | 65/157 |
| 1-305827 | 12/1989 | Japan | 65/319 |
| 2-44033 | 2/1990 | Japan | 65/275 |
| 3-187931 | 8/1991 | Japan | 65/157 |

Primary Examiner—Stanley S. Silverman
Assistant Examiner—Jacqueline A Ruller
Attorney, Agent, or Firm—Lorusso & Loud

[57] ABSTRACT

A molding die assembly includes an upper molding die and a lower molding die facing the upper molding die with provision for their alignment. The upper molding die includes an upper core, while the lower molding die includes a hollow cylinder and a lower core. The upper core has one of the molding surfaces that corresponds to a molding, while the lower core has the other molding surface corresponding to the molding. The lower core slides in the cylinder and defines a cavity in cooperation with the upper core. A clamping device applies a clamping force to the upper molding die and the lower molding die, and a compression device applies a compressive force between the upper core and the lower core. The clamping force is generated between the upper molding die and the lower molding die but not between the upper core and the lower core so that no clamping force is applied to the preform. Hence, if the upper platen and the lower platen are not parallel or if the volume of the preforms varies, surface accuracy and shape accuracy of the molding are still achieved.

13 Claims, 19 Drawing Sheets

GLASS COMPRESSION MOLDING MACHINE AND MACHINING CHAMBER THEREFOR

BACKGROUND OF THE INVENTION

The present invention relates to a glass compression molding machine and a system employing same.

Previously, when an optical glass lens, for example, was molded, glass which had been melted and solidified was rough cut, subjected to grinding and so forth to form a glass preform of predetermined shape. Then, the preform was placed into a molding die assembly having precise molding surfaces to compress the preform with heating, followed by gradually cooling the preform. The molding would then be ejected from the molding die assembly.

FIG. 1 illustrates the state of a molding die assembly of a conventional glass compression molding machine before compression is performed. FIG. 2 illustrates the state of the molding die assembly of the conventional glass compression molding machine after compression has been performed.

Referring to the drawings, reference numeral 1 represents an upper core, 2 represents a lower core, and 3 represents a cylinder disposed between the upper core 1 and the lower core 2 to guide the vertical movement of the upper core 1. The upper core 1 includes a flange portion 1a for contact with an upper heating plate (omitted from illustration), and a column portion 1b formed integrally with the flange portion 1a. A lower surface 1c of the column portion 1b has a shape that corresponds to a molding 8.

The lower core 2 includes a flange portion 2a for contact with a lower heating plate (omitted from illustration) and a column portion 2b formed integrally with the flange portion 2a. An upper surface 2c of the column portion 2b has a shape that corresponds to the molding 8 so that a cavity 4 is formed in cooperation with lower surface 1c of the column portion 1b.

The cylinder 3 is shaped to mate with the column portion 2b of the lower core 2, the lower surface of the cylinder 3 coming into contact with the flange portion 2a of the lower core 2. The upper core 1 forms an upper molding die 6, while the cylinder 3 and the lower core 2 form a lower molding die 7.

With the upper molding die 6 separated from the lower molding die 7, a robot (omitted from illustration) places a preform 5 on the foregoing lower molding die 7. Then, an upper platen (omitted from illustration) is moved downwards closing the die cavity and clamping upper and lower molding dies 6 and 7 together. The preform 5 is then heated and compressed so that the molding 8 is obtained as shown in FIG. 2. The molding 8 is cooled, and then the die assembly is opened by moving the upper platen upward. The molding 8 is removed by a robot or the like.

Therefore, each of the upper platen and lower platen (omitted from illustration) is provided with a preform-injecting/molding-ejecting station, a clamping/heating/compressing station and a gradual-cooling station. Furthermore, independent clamping devices (omitted from illustration) for heating, compressing and gradually cooling are provided.

In compression, a compressive force is applied to the preform 5 in the cavity 4. The relative dimensions of the upper molding die 6 and the lower molding die 7 are set to provide a slight clearance d upon completion of the compression.

The upper molding die 6 and the lower molding die 7 of the foregoing type, generally made of hard metal or ceramic, are used to mold glass at high temperature and high pressure, resulting in adhesion of molten glass to the surfaces of the upper core 1 and the lower core 2. Accordingly, the upper core 1 and the lower core 2 are covered with thin films to prevent the adhesion of the molten glass to their surfaces.

However, to the extent that the upper platen and the lower platen of the foregoing glass compression molding machine are not parallel, the upper molding die 6 and the lower molding die 7 will not be properly aligned. As a result, the surface accuracy and the shape accuracy of the molding 8 are reduced and, in particular, if the molding 8 is a glass lens, the result is distortion of the optical axis of the glass lens.

FIG. 3 is a sectional view explaining the degree of parallelism between the upper platen and the lower platen of the conventional glass compression machine. FIG. 4 illustrates a conventional glass lens product.

In FIG. 3, reference numeral 1 represents an upper core, 2 represents a lower core, 3 represents a cylinder, 6 represents an upper molding die and 7 represents a lower molding die. Reference numeral 21 represents an upper heating plate to be brought into contact with the upper core 1, and 45 represents a lower heating plate to be brought into contact with the lower core 2. The upper heating plate 21 is fastened to the upper platen 9, while the lower heating plate 45 is fastened to the lower platen 10.

If the degree of parallelism between the upper platen 9 and the lower platen 10 of the foregoing molding die assembly is poor, clamping and compressing cause a difference to occur between, for example, front distance $H_1$ and back distance $H_2$ between the upper heating plate 21 and the lower heating plate 45.

Referring to FIG. 4, reference numeral 8 represents a glass lens molding having thickness T. Reference numeral 8a represents a first optical surface and 8b represents a second optical surface respectively having radii of curvature $R_1$ and $R_2$. If the degree of parallelism between the upper platen 9 (see FIG. 3) and the lower platen 10 is poor, distortion e of the optical axis takes place, causing the thickness of the peripheral ends of the molding 8 to have different values $t_1$ and $t_2$. Therefore, sloping of the optical surfaces 8a and 8b expressed by $\Delta t$ $(=t_2-t_1)$ is seen.

Where a plurality of upper molding dies 6 and lower molding dies 7 are moved between the foregoing stations, the degree of parallelism between the upper molding die 6 and the lower molding die 7 may also be poor and, as a result, the surface accuracy and the shape accuracy of the molding 8 become poor.

FIG. 5 is a cross-sectional view illustrating the degree of parallelism between the upper platen and the lower platen of a conventional glass compression molding machine using plural die assemblies. Referring to FIG. 5, reference numeral 6 represents an upper molding die, 7 represents a lower molding die, 8 represents a molding, 9 represents an upper platen, 10 represents a lower platen, 21 represents an upper heating plate and 45 represents a lower heating plate. In this case, a plurality of upper molding dies 6 are brought into contact with the upper heating plate 21 and a plurality of lower molding dies 7 are brought into contact with the lower heating plate 45 in the clamping/heating/compression station.

If the preform 5 (see FIG. 1) has not been previously machined prior to placement on the lower molding die 7, the volume of each preform 5 will vary by a degree of several percent. Differences in volume as between different preforms leads to a reduction in the degree of parallelism between the upper platen 9 and the lower platen 10. In other words, a difference between the front distance $H_1$ and the back distance $H_2$, between the upper heating plate 21 and the lower heating plate 45, is seen. As a result, one of the molding die assemblies is compressed excessively, while the other is compressed insufficiently. In this case, thickness $T_1$ of the front molding 8 and thickness $T_2$ of the rear molding 8 will be different from each other, thus reducing surface accuracy and shape accuracy.

In the foregoing conventional glass compression molding machine, the upper core 1 and the lower core 2 are covered with thin films to prevent the adhesion of molten glass to their surfaces. As a result, repeated molding operations will repeatedly subject the foregoing thin films to a temperature which is higher than 300° C., causing the thin films to be oxidized. Hence, the durability of the molding die assembly deteriorates.

Therefore, the temperature of the upper molding die 6 and that of the lower molding die 7 cannot be detected accurately, and, accordingly, the control of the temperature cannot be performed accurately.

SUMMARY OF THE INVENTION

It is an object of the present invention to provide a glass compression molding machine and a machining chamber therefor that are capable of overcoming the foregoing problems experienced with the conventional glass compression molding machine and capable of improving the durability of a molding die assembly and performing accurate temperature control while maintaining good accuracy of surface and shape even if the degree of parallelism between the upper platen and the lower platen is poor and even if the preforms have different volumes.

In order to achieve the foregoing object, the glass compression molding machine according to the present invention provides a molding die assembly, wherein an upper molding die and a lower molding die are aligned by a mating fit, i.e. a "spigot and socket" arrangement.

The upper molding die has an upper core, while the lower molding die has a hollow cylinder and a lower core. The upper core has one of the molding surfaces that corresponds to the molding, while the lower core has the other molding surface. The lower core slides in the cylinder and forms a die cavity in cooperation with the upper core.

Further, a clamping device for clamping the upper molding die and the lower molding die together and a compression device for generating a compressive force between the upper core and the lower core are provided.

Therefore, closing of the die cavity is performed by moving the upper molding die downward into contact with the lower molding die. When clamping, heating and compressing are performed, the upper core or the lower core is moved while maintaining the contact between the upper molding die and the lower molding die. At this time, a preform placed into the molding die assembly is deformed to produce a molding.

In the present invention, the clamping generates a force between the upper molding die and the lower molding die, but not between the upper core and the lower core. Therefore, no clamping force is applied to the preform. Hence, even if the degree of parallelism between the upper platen and the lower platen is poor or the volumes of the preforms differ, the surface accuracy and the shape accuracy of the molding can be maintained.

If the upper molding die has no cylinder, the cylinder of the lower molding die is aligned with the upper core by a mating fit, i.e. a spigot and socket connection. If the upper molding die has a hollow cylinder and an upper core that slides in the cylinder, the cylinder of the lower molding die is aligned with the cylinder of the upper molding die by the mating fit.

Where a plurality of molding die assemblies and compression devices are provided, the compression devices respectively and independently generate compressive forces.

The upper molding die and/or the lower molding die is provided with a means for supplying inactive gas to the area between the upper molding die and the lower molding die. In this case, the inactive gas is supplied through a gap formed between the core and the cylinder. Further, a nozzle ring may be disposed around the cylinder so as to supply the inactive gas through a nozzle formed between the cylinder and the nozzle ring.

Therefore, oxygen can be purged from the die cavity by displacement by the inactive gas. The inactive gas forms a barrier around the molding die assembly, so that the ambient air does not enter the die cavity. As a result, the oxidation of the thin film applied to the surfaces of the cores, by contact with oxygen, can be prevented and the durability of the molding die assembly is improved.

Temperature sensors are embedded in the cylinders, and plural heating means are disposed on the outer surfaces of the cylinders and independently controlled for each of the molding die assemblies in accordance with the temperatures detected by the temperature sensors. Therefore, the temperature of each core can be maintained at an arbitrary level at each station, and accordingly, accurate temperature control can be achieved.

The chamber housing the glass compression molding apparatus, including the molding die assembly composed of the upper molding die and the lower molding die, has a sealed casing and defines a clamping/heating/compressing station, a gradual-cooling station, and a preform-injecting/molding-ejecting station for the molding die assembly.

A shutter is provided in the casing to selectively open or close access to the preform-injecting/molding-ejecting station. Further, a first inactive-gas supply means and a second inactive-gas supply means are provided, the first inactive gas supply means supplying inactive gas to the area between the upper molding die and the lower molding die. The second inactive gas supply means directly supplies inactive gas into the casing.

A high-level non-oxygen area, in which the concentration of oxygen is low, is formed around the molding die assembly in the molding chamber, while a low-level non-oxygen area, in which the concentration of oxygen is somewhat higher, is formed in the remaining portion of the chamber. Therefore, even if the shutter is opened, oxidation of the thin film due to its contact with oxygen can be prevented. As a result, the durability of the molding die assembly is improved.

BRIEF DESCRIPTION OF THE DRAWINGS

The structures and features of the invention will be apparent from the following description taken in connection with the accompanying drawings wherein.

DESCRIPTION OF PREFERRED EMBODIMENT

Preferred embodiments of the present invention will now be described in detail with reference to the drawings.

Figure 6:
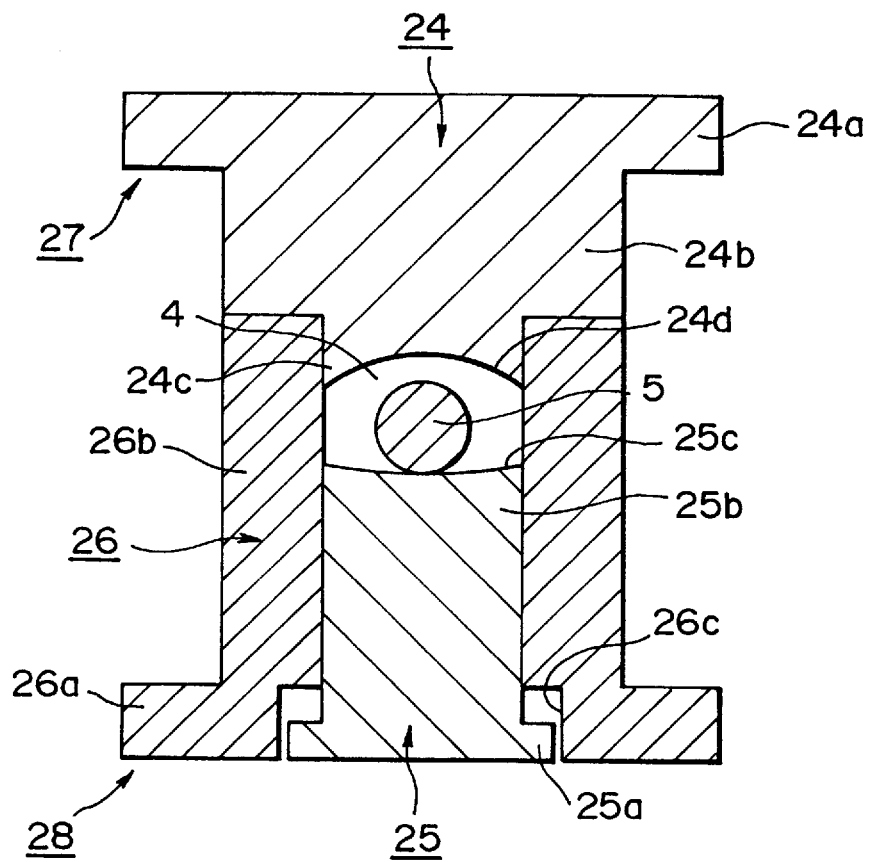
FIG. 6 is a cross-sectional view of a molding die assembly of a glass compression molding machine according to a first embodiment of the present invention before compression is performed.

Referring to FIG. 6, reference numeral 24 represents an upper core, 25 represents a lower core that can be brought into contact with the upper core 24 and withdrawn and 26 represents a lower cylinder that can be brought into contact with a shoulder of the upper core 24, and that can be separated from the same, the lower cylinder 26 guiding the vertical movement of the lower core 25. The upper core 24 includes a flanged portion 24a for contact with an upper heating plate (omitted from illustration) a column portion 24b formed integrally with the flanged portion 24a and having the same diameter as that of the lower cylinder 26, and a projection 24c formed integrally with the column portion 24b and having the same diameter as that of a column portion 25b (to be described later) of the lower core 25. A lower surface 24d of the projection 24c has a shape that corresponds to a molding 8.

The lower core 25 includes a flanged portion 25a for contact with a compression rod (omitted from illustration) and a column portion 25b formed integrally with the flanged portion 25a. An upper surface 25c of the column portion 25b has a shape that corresponds to the molding 8, forming a cavity 4 in cooperation with the lower surface 24d of the projection 24c.

The lower cylinder 26 includes a flanged portion 26a for contact with a lower heating plate (omitted from illustration) and a cylindrical portion 26b formed integrally with the flanged portion 26a. The lower cylinder 26 is mounted so that the end surface of the cylindrical portion 26b may be brought into contact with an annular shoulder of the column portion 24b of the upper core 24 and withdrawn from the same. The cylindrical portion 26b mates with the column portion 25b of the lower core 25 slidably disposed therein, and has a large-diameter bore 26c at the lower end of its inner surface. The large-diameter bore portion 26c receives the flange portion 25a of the lower core 25. In order to enable the flange portion 25a to be moved upward in the large-diameter portion 26c before and after the compression, a clearance d' is provided.

It should be noted that the upper core 24 forms an upper molding die 27, and the lower core 25 and the cylinder 26 form a lower molding die 28.

Figure 7:
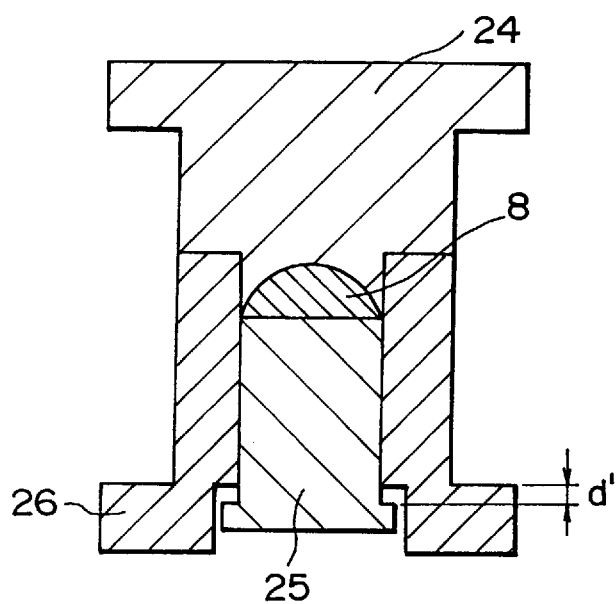
FIG. 7 is a cross-sectional view of the molding die assembly of the glass compression molding machine of FIG. 6 after compression has been performed.

With the molding die assembly open, a robot (omitted from illustration) places a preform 5 on the lower molding die 28. Then an upper platen (omitted from illustration) is moved downward to close the die assembly and the end surface of the column portion 24b of the upper molding die 27 is brought into contact with the end surface of the cylindrical portion 26b. Then, the preform 5 is heated, and the compression rod then presses against the lower core 25 to move column portion 25b upward along the inner surface of the cylindrical portion 26b. As a result, the preform 5 is compressed as shown in FIG. 7 so that a molding 8 is formed.

Then, the molding 8 is cooled, the upper platen is moved upward to open the dies, and the molding 8 is removed by a robot or the like.

Both the upper platen and the lower platen (omitted from illustration) move between a preform-injecting/molding-ejecting station, a clamping/heating/compressing station and a gradual-cooling station. Furthermore, independent clamping devices (omitted from illustration) are provided at each station.

At the time of compression, compressive force is applied to the preform 5 in the cavity 4. The dimensions are set so that a slight clearance d' remains between the downward end surface of the large-diameter portion 26c and the upward end surface of the flange portion 25a at the time of the completion of the compression.

If the dies are clamped with a poor degree of parallelism between the upper platen and the lower platen, the shoulder of the column portion 24b of the upper core 24 will contact the end surface of the cylindrical portion 26b of the lower cylinder 26. Therefore, the clamping force can be received by the upper core 24 and the lower cylinder 26, with the result that no clamping force is applied to the preform 5.

The compressive force for molding the preform 5 is not supplied from the upper platen or the lower platen but, rather, is supplied from the compression rod. Moreover, the column portion 25b of the lower core 25 is confined by and slides along the inner surface of the cylindrical portion 26b, thus ensuring good parallelism between the upper core 24 and the lower core 25. As a result, the surface accuracy and the shape accuracy of the molding 8 is improved.

Figure 8:
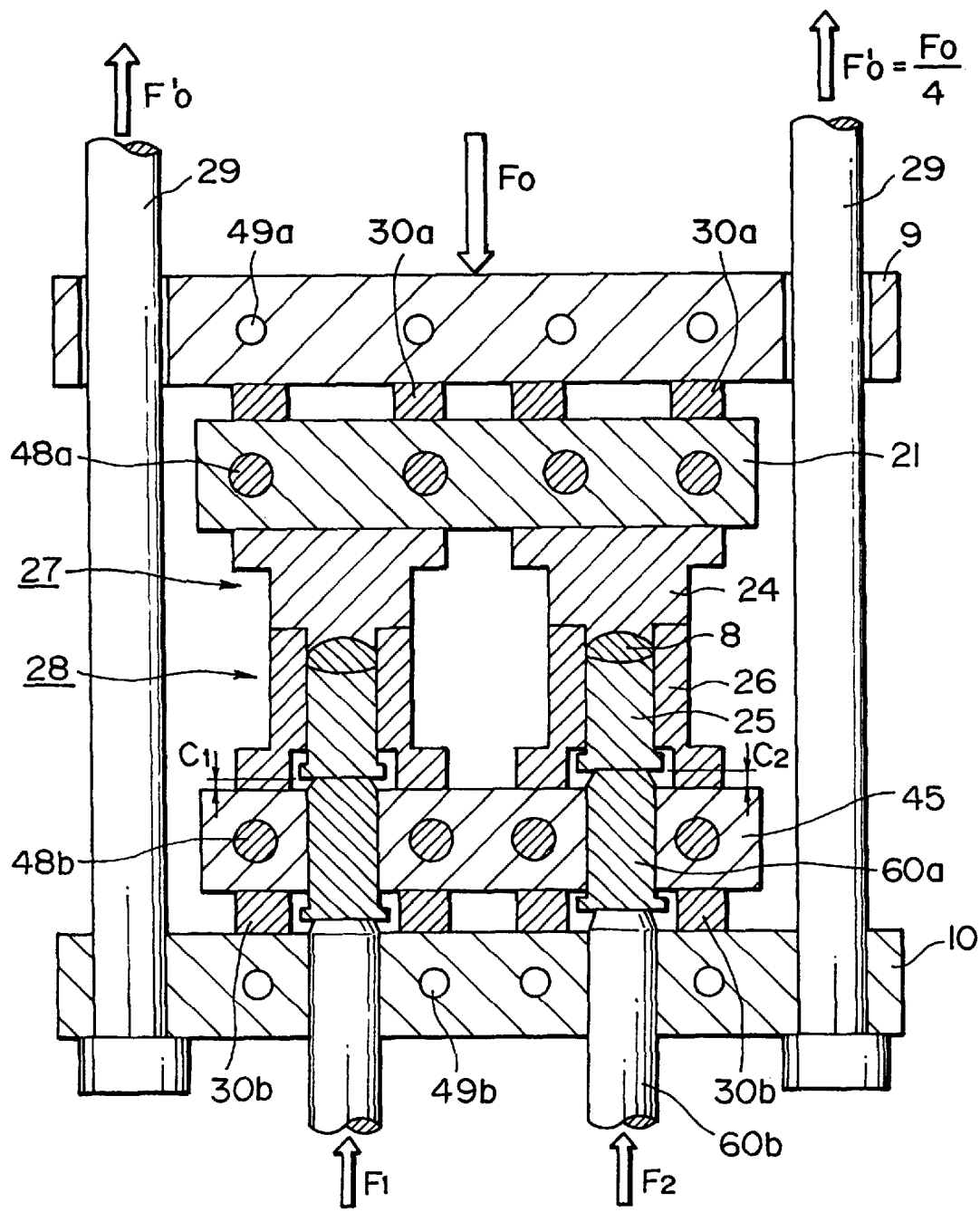
FIG. 8 is a cross-sectional view of a glass compression molding machine according to a second embodiment of the present invention.

FIG. 8 is a cross-sectional view of a glass compression molding machine according to a second embodiment of the present invention wherein reference numeral 8 represents a molding, 9 represents an upper platen, 10 represents a lower platen, 25 represents a lower core, 26 represents a lower cylinder, 27 represents an upper molding die, 28 represents a lower molding die, and 29 represents two of four tie bars which guide vertical movement of the upper platen 9 relative to the lower platen 10.

An upper heating plate 21 is fixed to the upper platen 9 through an interposed heat insulating ring 30a, while a lower heating plate 45 is fixed to the lower platen 10 through an interposed heat insulating ring 30b. A pair of upper molding dies 27 and a pair of lower molding dies 28 are shown disposed between the upper heating plate 21 and the lower heating plate 45. It is preferable that the heat insulating rings 30a and 30b be made of a ceramic exhibiting low heat conductivity and that the area of contact of those rings with the upper platen 9, the upper heating plate 21, the lower platen 10 and the lower heating plate 45 be minimal.

A clamping device (omitted from illustration) is connected to the upper platen 9 to move the upper platen 9 downward along the tie bars 29. As a result, the molding die assembly is clamped with clamping force $F_0$, and the preform 5 (see FIG. 6) is heated and compressed so that the molding 8 is obtained.

Multiple cartridge heaters 48a are embedded in the upper heating plate 21 and multiple cartridge heaters 48b are embedded in the lower heating plate 45 to heat the upper heating plate 21 and the lower heating plate 45 to a temperature of 500 to 600° C.

Where the molding die assembly is clamped with clamping force $F_0$ by operating the clamping device, a tension force $F_o'$ (=$F_o/4$) is received by each tie bar 29 as a reaction.

A pair of ceramic compression extension rods 60a are disposed below the lower cores 25, respectively, and a pair of ceramic compression rods 60b are disposed below the compression extension rods 60a, respectively. As a result, the upward movement of the compression extension rods 60a and the compression rods 60b compresses the preforms 5 with compressive forces $F_1$ and $F_2$, respectively. Although two compression rods 60b are provided in this embodiment, one or four or more compression rods 60b may be provided. It is preferable that the compression extension rods 60a be made of ceramic to prevent radiation of heat from the lower core 25.

The compression rods 60b are disposed at positions that correspond to the positions of the cavities 4 so that the compression rods 60b transmit the compressive forces $F_1$ and $F_2$ from the compression devices (omitted from illustration). The compression devices operating on the corresponding compression rods 60b are able to be independently operated to allow for a difference in the volumes of the preforms 5 and to maintain parallelism between the upper platen 9 and the lower platen 10.

The sum of the maximum values of the compressive forces $F_1$, and $F_2$ is set smaller than the maximum value of the clamping force $F_0$ as expressed by the following expression:

$$F_1 + F_2 < F_0$$

Further, the compression device connected to the compression rod 60b can be operated in any one of the equal-compressive-force control mode, the equal-compression-quantity control mode, and equal-compressive-force/equal-compression-quantity switch control mode.

In the equal-compressive-force control mode, control is performed so that the compressive force $F_1$ and the compressive force $F_2$ are equal:

$$F_1 = F_2$$

, while the compression quantities $C_1$ and $C_2$ are unequal:

$$C_1 \neq C_2$$

In the equal-compression-quantity control mode, on the other hand, the compressive force $F_1$ does not equal the compressive force $F_2$:

$$F_1 \neq F_2$$

, while the compression quantities $C_1$ and $C_2$ are equal:

$$C_1 = C_2$$

Reference numerals 49a and 49b represent passages for cooling-water formed, respectively, in the upper platen 9 and the lower platen 10 to cool the upper platen 9 and the lower platen 10 to about 50° C. and to prevent a rise in the temperature due to heat transmitted or radiated from the upper heating plate 21 and the lower heating plate 45.

In the operation of the glass compressing molding machine described above, when the preform 5 is placed in the lower molding die 28 in the preform-injecting/molding-ejecting station, the upper platen 9 is moved downward by the clamping device so that the dies are closed. As a result, the end surface of the column portion 24b of the upper core 24 and the end surface of the cylindrical portion 26b of the cylinder 26 are brought into contact with each other. At this time, the lower surface of the flange portion 26a of the cylinder 26 and the lower surface of the flange portion 25a of the lower core 25 are positioned on the same plane so that the compressive force $F_1$ and the compressive force $F_2$ do not act on the preform 5.

When the upper molding die 27 and the lower molding die 28 have been moved to the clamping/heating/compressing station, the upper molding die 27, the lower molding die 28 and the preform 5 are heated by heat transmitted from the upper heating plate 21 and the lower heating plate 45. The temperature at which the preform 5 can be deformed by compression is higher than the glass transition point $T_g$ of the preform material by 50 to 100° C. or more. Since it is difficult to raise the temperature instantaneously from room temperature to a temperature higher than the glass transition point $T_g$ by 50 to 100° C. or more, because of the molding cycle, the preform-injecting/molding-ejecting station is preheated to a temperature lower than the glass transition point $T_g$ by about 50° C.

Figure 9:
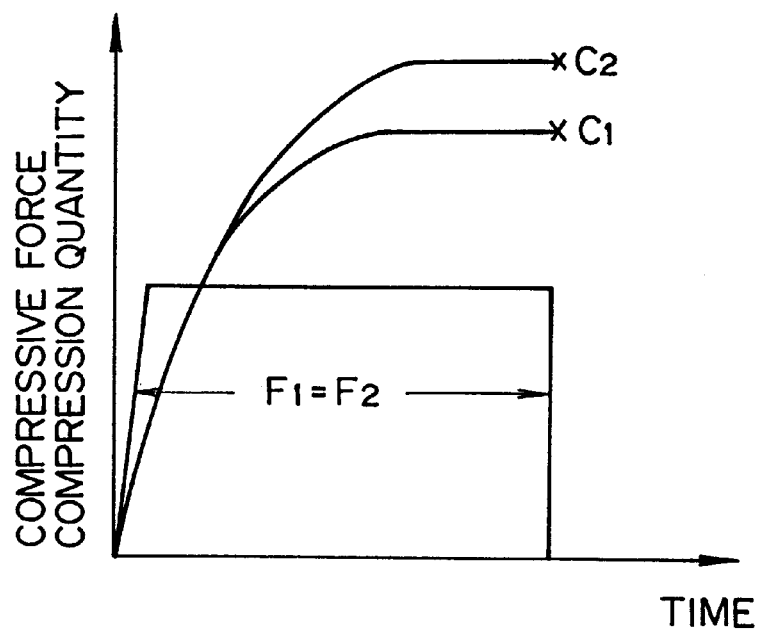
FIG. 9 is a time chart for equal-compressive-force control according to the second embodiment of the present invention.

When a predetermined time (one to two minutes) has passed after movement of the upper molding die 27 and the lower molding die 28 to the clamping/heating/compressing station as described above, the compression rod 60*b* is moved upwards. The compressive force $F_1$ and the compressive force $F_2$ applied to the compression rods 60*b* are made equal, as shown in FIG. 9. The preform 5 is gradually deformed until the compression quantities $C_1$ and $C_2$ are maximum after tens of seconds have passed. Therefore, a difference in the volumes of the preforms 5 results in a difference in the thickness T (see FIG. 4) of the moldings 8.

Figure 1:
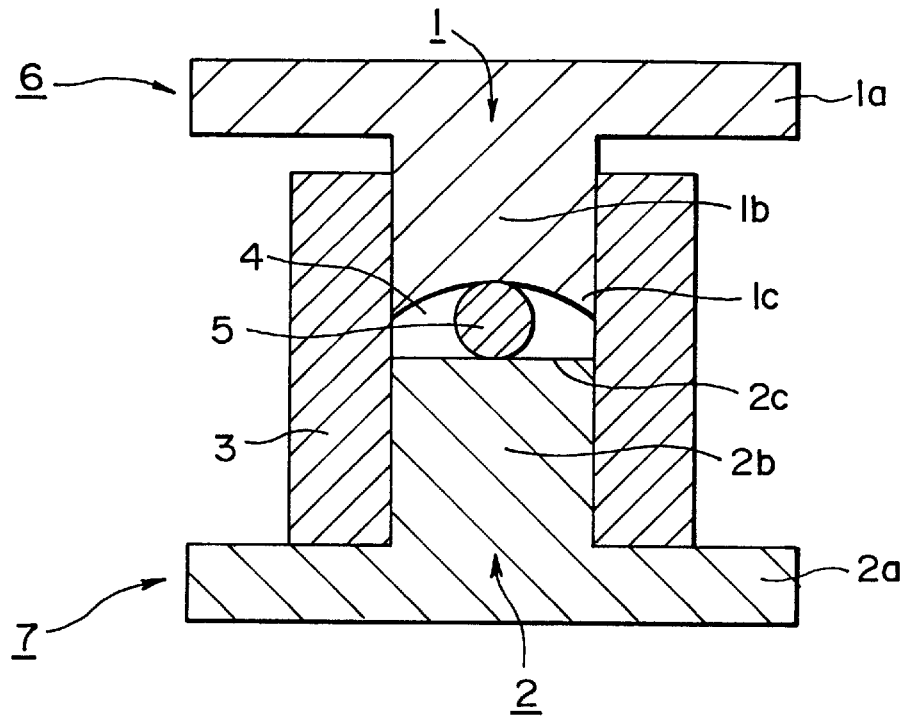
FIG. 1 is a cross-sectional view of a molding die assembly of a conventional glass compression molding machine before compression is performed.
Figure 2:
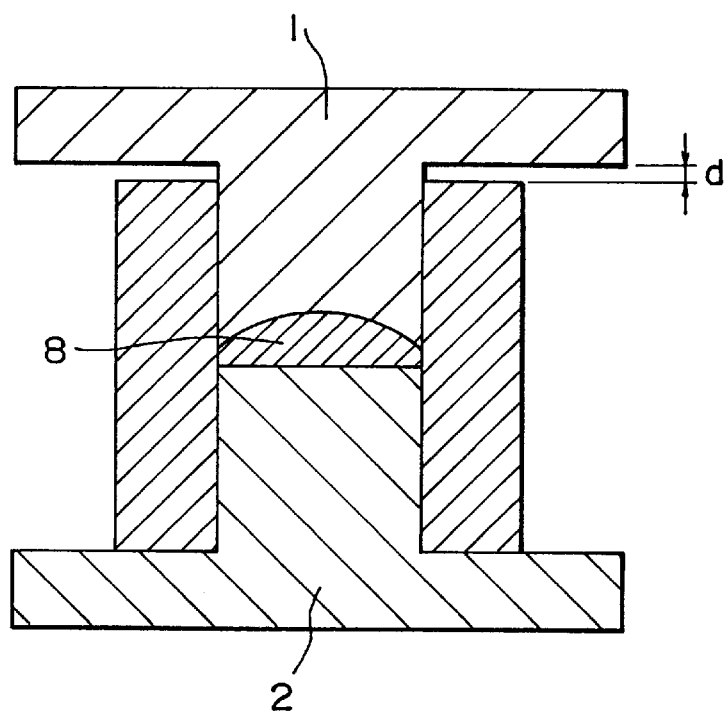
FIG. 2 is a cross-sectional view of the molding die assembly of the conventional glass compression molding machine of FIG. 1 after compression has been performed.
Figure 3:
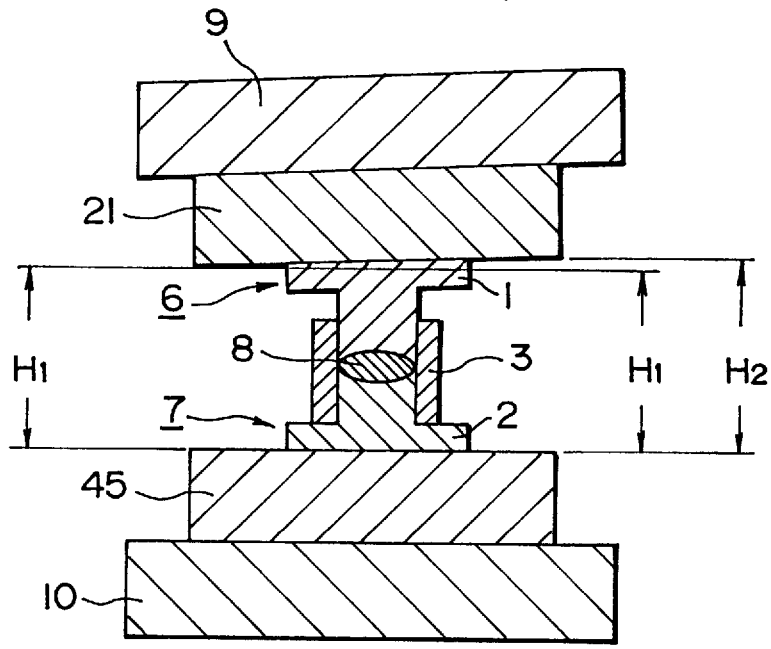
FIG. 3 is a cross-sectional view illustrating parallelism between an upper platen and a lower platen of the conventional glass compression molding machine of FIG. 1.
Figure 4:
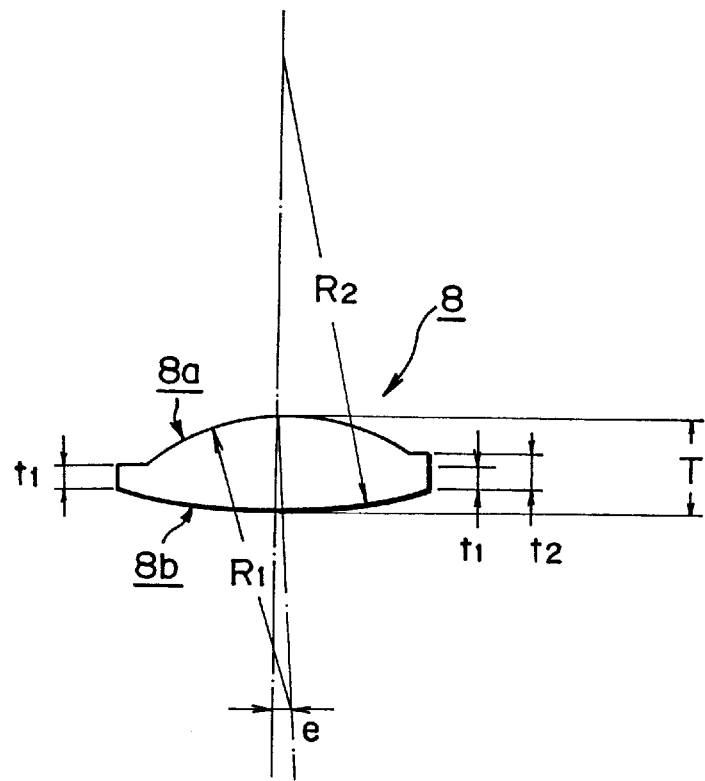
FIG. 4 is a side view of a glass lens.
Figure 5:
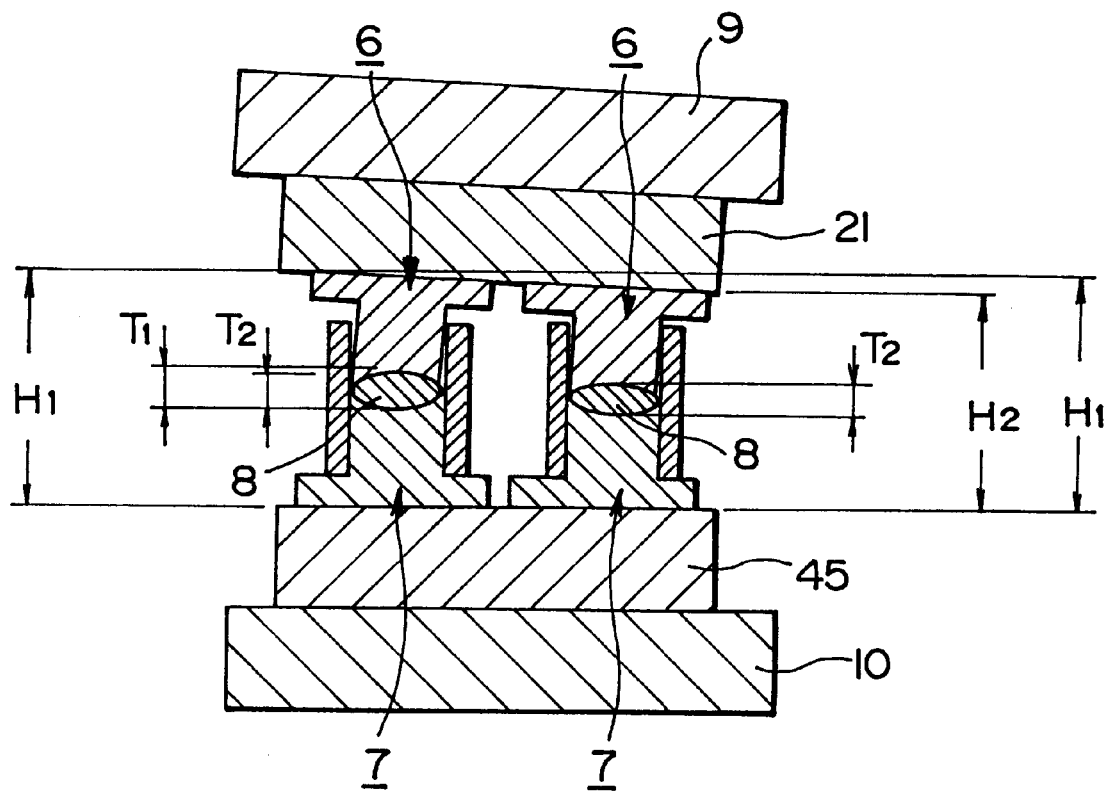
FIG. 5 is a cross-sectional view illustrating parallelism between the upper platen and the lower platen in a conventional glass compression molding machine with plural die assemblies.

Since the compression process is commenced after the end surface of the column portion 24*b* of the upper core 24 and the end surface of the cylindrical portion 26*b* of the lower cylinder 26 have been brought into contact with each other, inclination of the optical surface 8*a* relative to 8*b* as shown in FIG. 4 can be prevented.

Since the compressive quantities $C_1$ and $C_2$ are different from each other in this case, the thickness T of the moldings 8 varies. However, deterioration in the optical characteristics can be prevented.

Figure 10:
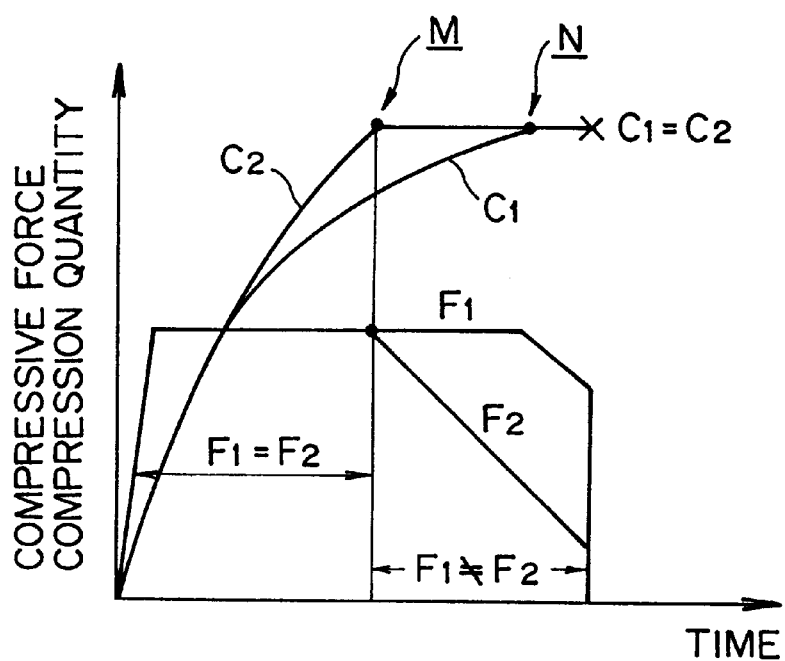
FIG. 10 is a time chart for equal-compression-quantity control according to the second embodiment of the present invention.

If variations in the thickness T are to be avoided, as shown in FIG. 10, the compressive force $F_1$ and the compressive force $F_2$ must be controlled until the thickness T equals a target thickness. When the thickness T of one of the preforms 5 reaches a target thickness (point M), tho corresponding rod 60*b* is locked to prevent its further upward movement.

The same compressive force $F_1$ is continuously applied to the compression rods 60*b*. When the thickness T of the preform 5 reaches a target value (point N), the compression rod 60*b* is locked. When the compression rod 60*b* is locked, the upper molding die 27 and the lower molding die 28 are in a state where they are completely closed. The absorption of the stress in the glass will naturally reduce its reaction. Therefore, the compressive force $F_1$ and the compressive force $F_2$ are also reduced.

A third embodiment of the present invention will now be described. Referring to the drawings, reference numeral 11 represents an upper molding die. The upper molding die 11 comprises an upper core 12 and an upper cylinder 13 surrounding the upper core 12. The upper core 12 is supported by the upper cylinder 13 at the top end thereof, while the lower surface of same has a shape that corresponds to the molding 8 (see FIG. 8). The upper molding die 11 is supported by a cylindrical upper-molding-die holder 15.

The upper-molding-die holder 15 has an upper-molding-die fastening plate 16 extending laterally, and is supported by a pair of upper rails 17. The upper rails 17 are disposed parallel to each other along an upper platen (omitted from illustration). By sliding the upper-molding-die fastening plate 16 along the upper rails 17, the upper molding die 11 can be moved along the upper platen. Reference numeral 20 represents a bolt for fixing the upper-molding-die holder 15 to the upper-molding-die fastening plate 16.

The upper platen is provided with a clamping/heating/compressing station and a gradual-cooling station. In the clamping/heating/compressing station, for example, an upper heating plate 21 is fastened to the upper platen.

To facilitate movement of the upper molding die 11 along the upper platen, the upper rails 17 can be spaced from the upper heating plate 21 by about 1 mm.

The upper cylinder 13 includes a temperature sensor 22 such as a thermocouple embedded therein. Since the leading end of the temperature sensor 22 is in contact with the upper core 12, the temperature of the upper core 12 can be detected. Further, a coil heater 23 is wound around the upper-molding-die holder 15 to control the temperature of the upper molding die 11. As a result, the upper molding die 11 can be preheated at the preform-injecting/molding-ejecting station. It should be noted that the temperature of the upper core 12 can be detected even if the leading end of the temperature sensor 22 is not in contact with the upper core 12.

Reference numeral 31 represents a lower molding die. The lower molding die 31 comprises a lower core 32, a cylindrical lower cylinder 33 surrounding the lower core 32, a pair of semicircular rings 34 and 35 formed by dividing an annular member into two sections, and a flange-like lower molding die retainer 36 integrally and radially extending from the lower end of the lower cylinder 33. The upper surface of the lower core 32 has a shape that corresponds to the molding 8. The lower molding die 31 is supported by a cylindrical lower-molding-die holder 38.

The lower-molding-die holder 38 has a lower-molding-die fastening plate 39 extending laterally. The lower-molding-die fastening plate 39 is supported by a pair of lower rails 41. The lower rails 41 are disposed parallel to each other along a lower platen (omitted from illustration). By sliding the lower-molding-die fastening plate 39 along the lower rails 41, the lower molding die 31 can be moved along the lower platen. Reference numeral 43 represents a bolt for fixing the lower-molding-die holder 38 to the lower-molding-die fastening plate 39.

The lower platen is provided with a clamping/heating/compressing station, a gradual-cooling station and a preform-injecting/molding-ejecting station. In the clamping/heating/compressing station, for example, a lower heating plate 45 is fastened to the lower platen.

To facilitate movement of the lower molding die 31 along the lower platen, the lower rails 41 are spaced from the lower heating plate 45 by about 1 mm.

The lower core 32 has a small-diameter portion 32*a* of a predetermined length, in the lower portion thereof, which is surrounded by the semicircular rings 34 and 35. Therefore, the lower core 32 can be moved vertically by a distance corresponding to the length of the small-diameter portion 32*a*, that is, by 5 to 10 mm in this case.

Since the lower cylinder 33 has a temperature sensor 46 such as a thermocouple embedded therein in such a manner that the leading end of the temperature sensor 46 is in contact with the lower core 32, the temperature of the lower core 32 can be detected. Further, a coil heater 47 is wound around the lower-molding-die holder 38 so that the temperature of the lower molding die 31 can be controlled independently from the upper molding die 11. As a result, the lower molding die 31 can be preheated at the molding-ejecting station. It should be noted that the temperature of the lower core 32 can be detected even if the leading end of the temperature sensor 46 is not in contact with the lower core 32.

In order to provide an atmosphere of inactive gas, for example nitrogen gas, the upper core 12 has a longitudinal notch 52 of a size from 50 to 100 $\mu$, and the lower core 32 has a longitudinal notch 53 of a size from 50 to 100 $\mu$. Further, an annular gap of about 5 $\mu$ is formed between the upper core 12 and the upper cylinder 13 and the same is formed between the lower core 32 and the lower cylinder 33.

The notch 52 is in registration with a passage in the upper heating plate 21 which, in turn, is connected to a line 55, communicating with a vacuum pump (omitted from illustration), for example a rotary pump, via an exhaust valve 56. On the other hand, the notch 53 registers with a passage in the lower heating plate 45 for connection to a nitrogen gas cylinder (omitted from illustration) via line 57 and a nitrogen gas injection valve 58. It should be noted that using the vacuum pump may be omitted.

The surfaces of the upper molding die holder 15 and the lower molding die holder 38 that face each other and the surfaces of the upper cylinder 13 and the lower cylinder 33 that face each other are machined to a flatness providing a hermetic seal when they are held between the upper heating plate 21 and the lower heating plate 45 and the clamping force is applied.

In order to enable the upper molding die 11 and the lower molding die 31 to be moved horizontally, provision is made for center alignment. Alignment is provided for by a tapered surface 33b formed on the exterior of the leading end of the lower cylinder 33. Center alignment is also provided by a tapered surface 12a formed around the exterior of the leading end of the upper core 12 and a tapered surface 33a formed inside the leading end of the lower cylinder 33.

Therefore, when the clamping operation is commenced, the inner surface of the upper-molding-die holder 15 and the tapered surface 33b formed on the leading end of the lower cylinder 33 are aligned with each other, followed by movement of the upper-molding-die holder 15 downward along the tapered surface 33b. As a result, an initial alignment is achieved. As the dies 11 and 31 move further together, the tapered surface 12a formed on the leading edge of the upper core 12 and the tapered surface 33a formed on the leading portion of the lower cylinder 33 are aligned with each other. As a result, the upper molding die 11 and the lower molding die 31 become completely aligned.

Reference numeral 60 represents a compression rod which forces the lower core 32 upward in the clamping/heating/compressing station to compress the preform 51.

The operation of the glass compression molding machine described above will now be described.

In the preform-injecting/molding-ejecting station, the preform 51 preheated to 300° C. is placed into the lower molding die 31 by a robot (omitted from illustration). The lower molding die 31 has been preheated to about 400° C.

Figure 11:
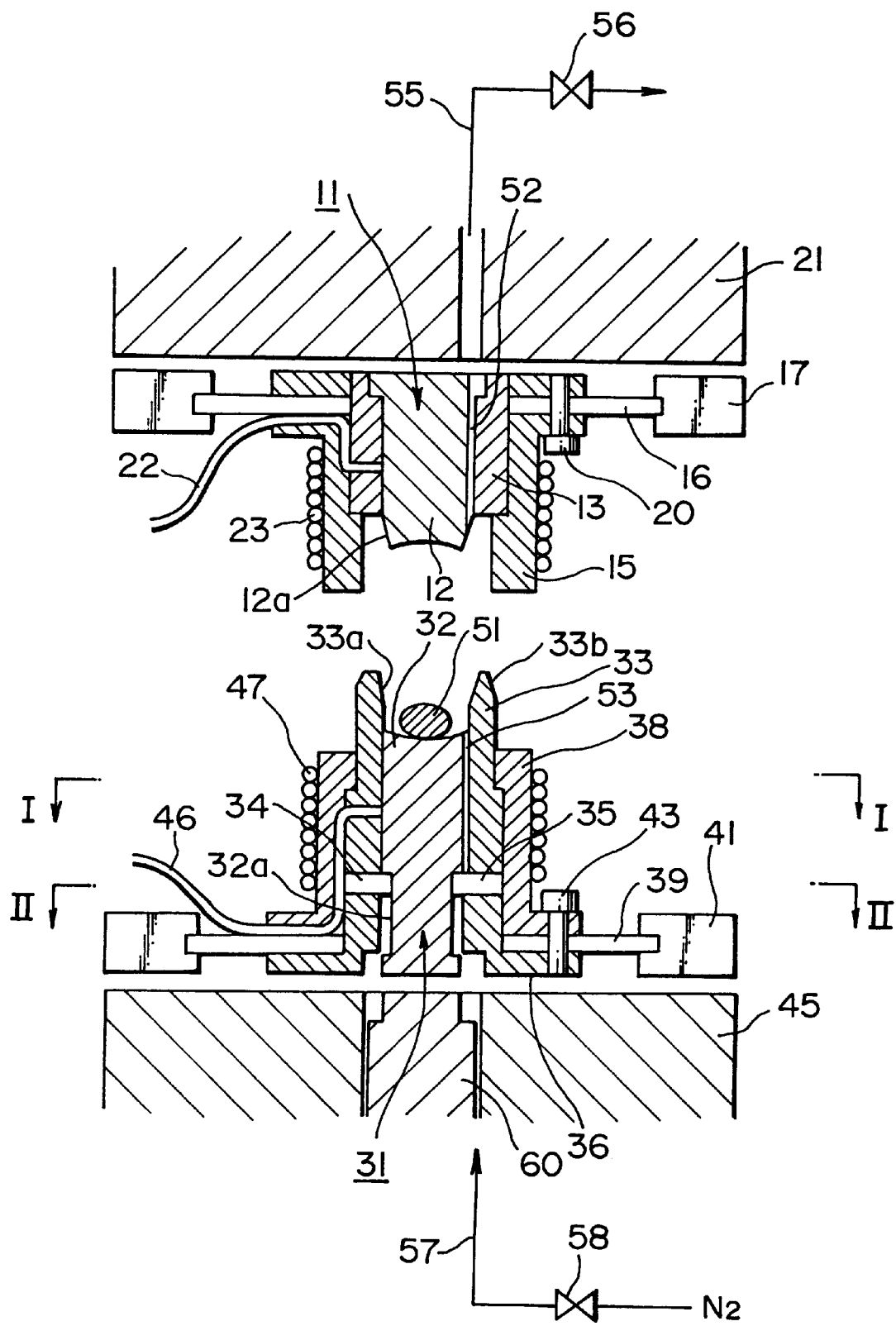
FIG. 11 is a cross-sectional view of a glass compression molding machine according to a third embodiment of the present invention.
Figure 12:
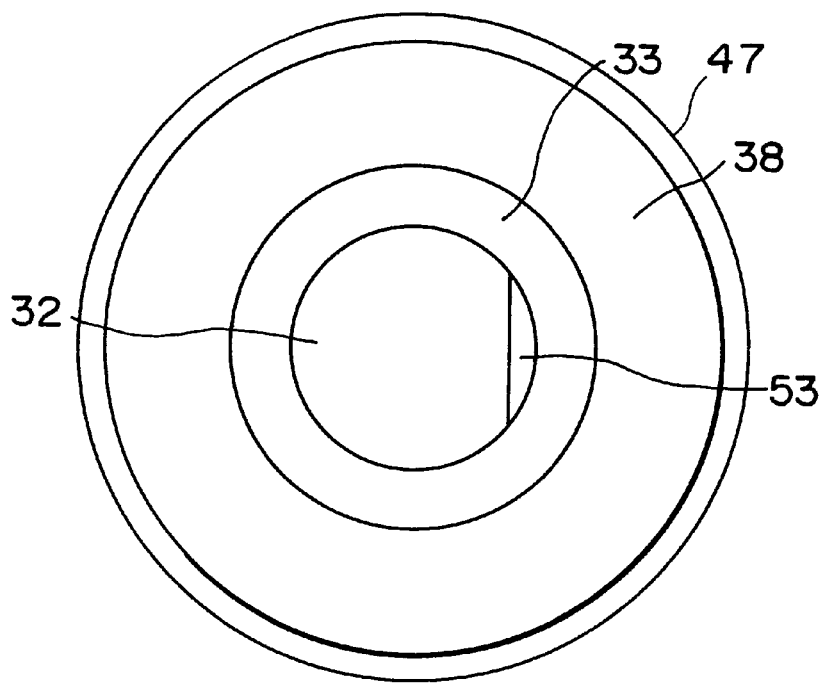
FIG. 12 is a cross sectional view taken along line I—I of FIG. 11.
Figure 13:
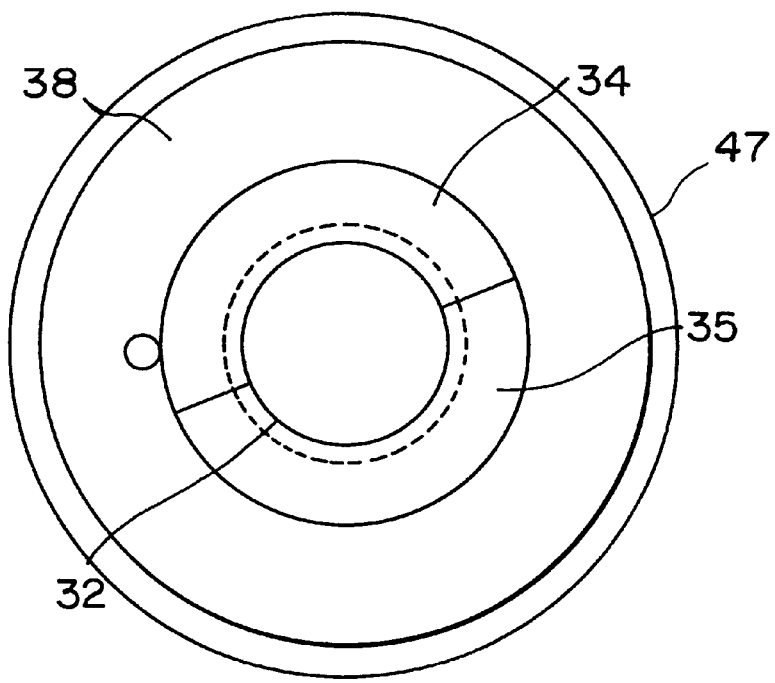
FIG. 13 is a cross sectional view taken along line II—II of FIG. 11.

The lower molding die 31 is moved along the lower rails 41 into the clamping/heating/compressing station so that the upper molding die 11 and the lower molding die 31 are positioned as shown in FIG. 11. There, the upper core 12 and the lower core 32 are respectively held in the upper-molding-die holder 15 and the lower-molding-die holder 38 is spaced from the upper heating plate 21 and the lower heating plate 45 by about 1 mm. The holders 15 and 38 are, in turn, supported by upper-molding-die fastening plate 16 and the lower-molding-die fastening plate 39.

Figure 14:
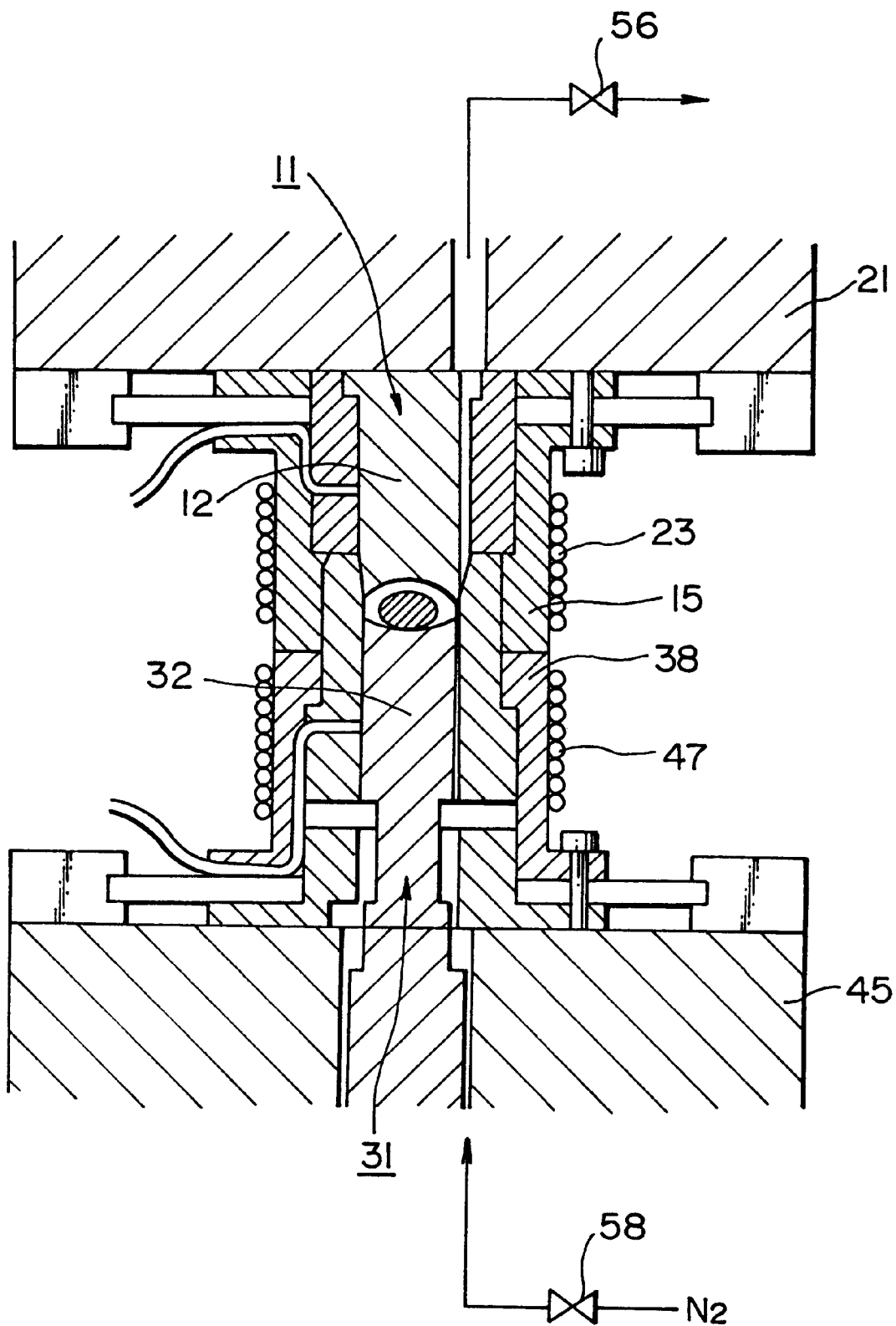
FIG. 14 is a cross sectional view illustrating a glass compression molding machine with a heating coil, according to the third embodiment of the present invention.

FIG. 14 illustrates heating according to a third embodiment of the present invention. When the clamping operation is commenced, the foregoing center-aligning is performed so that the state shown in FIG. 14 is realized. As shown in FIG. 14, the temperature of the upper heating plate 21 and that of the lower heating plate 45 are controlled at 500 to 600° C., while the lower molding die 31 is heated up from the preheated state (400° C.) with heat transmitted from the lower heating plate 45. The temperature set by the coil heaters 23 and 47 wound around the upper-molding-die holder 15 and the lower-molding-die holder 38 is raised from 400° C. to within a range of 500 to 600° C.

The area between the upper molding die 11 and the lower molding die 31 is hermetically sealed simultaneously with the commencement of the clamping operation. When the exhaust valve 56 is opened and the nitrogen-gas injection valve 58 is closed, air present between the upper molding die 11 and the lower molding die 31 is evacuated by a rotary pump (omitted from illustration) to produce a vacuum. When the exhaust valve 56 is then closed and the nitrogen-gas injection valve 58 is opened, nitrogen gas is supplied to the space between the upper molding die 11 and the lower molding die 31. It should be noted that the vacuum obtained with the rotary pump can be omitted.

Figure 15:
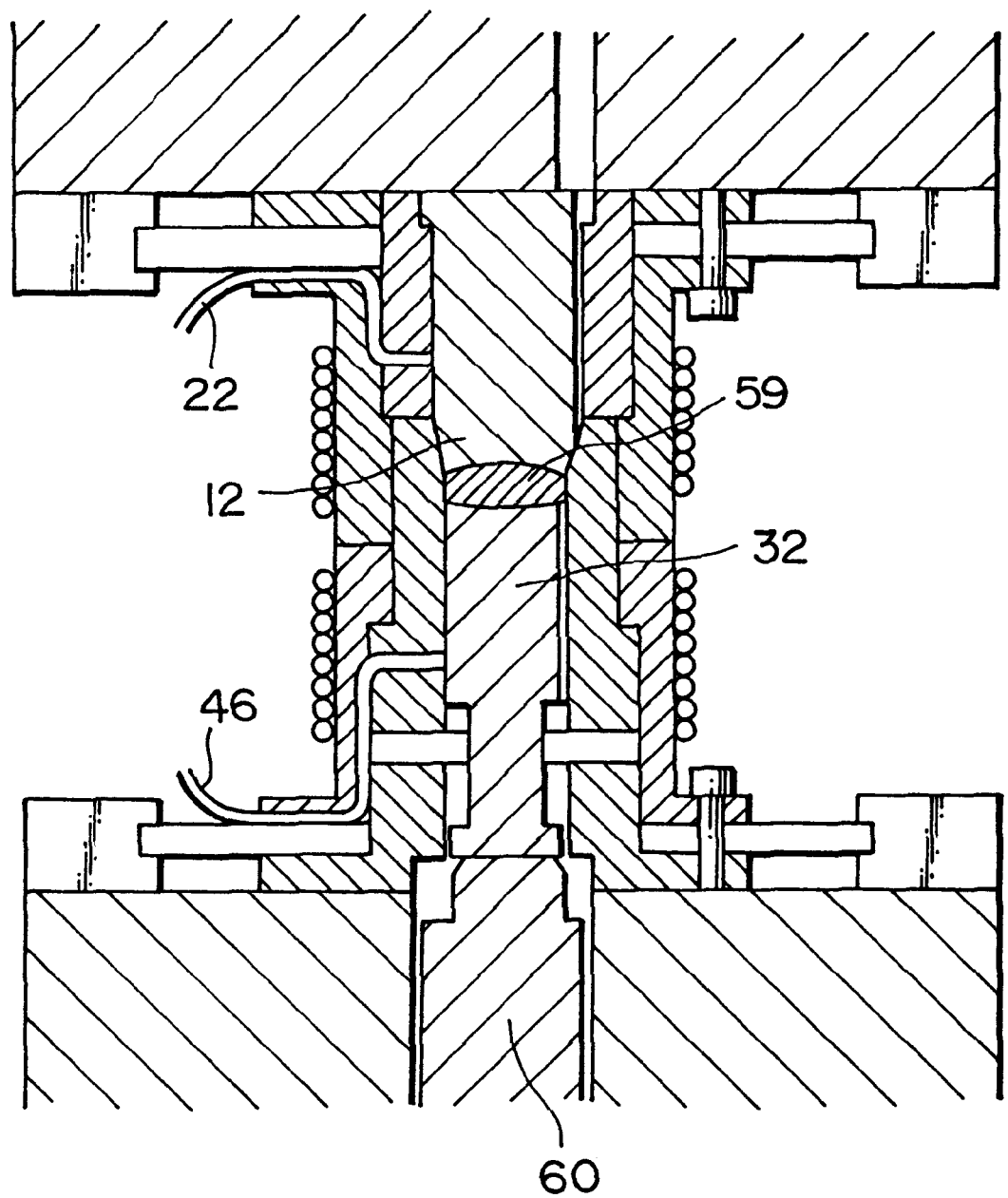
FIG. 15 is a cross-sectional view showing compression with the glass compression molding machine according to the third embodiment of the present invention.

FIG. 15 illustrates compression by the glass compression molding machine according to the third embodiment of the present invention. When the temperature of the upper core 12 and that of the lower core 32, detected by the temperature sensors 22 and 46, have risen to the level at which the preform 51 (see FIG. 11) is thermally deformed, the compression rod 60 is moved upwards and a controlled compressive force is applied to the preform 51. As a result, the shape of the upper core 12 and that of the lower core 32 are accurately transferred so that a molding 59 is obtained.

Figure 16:
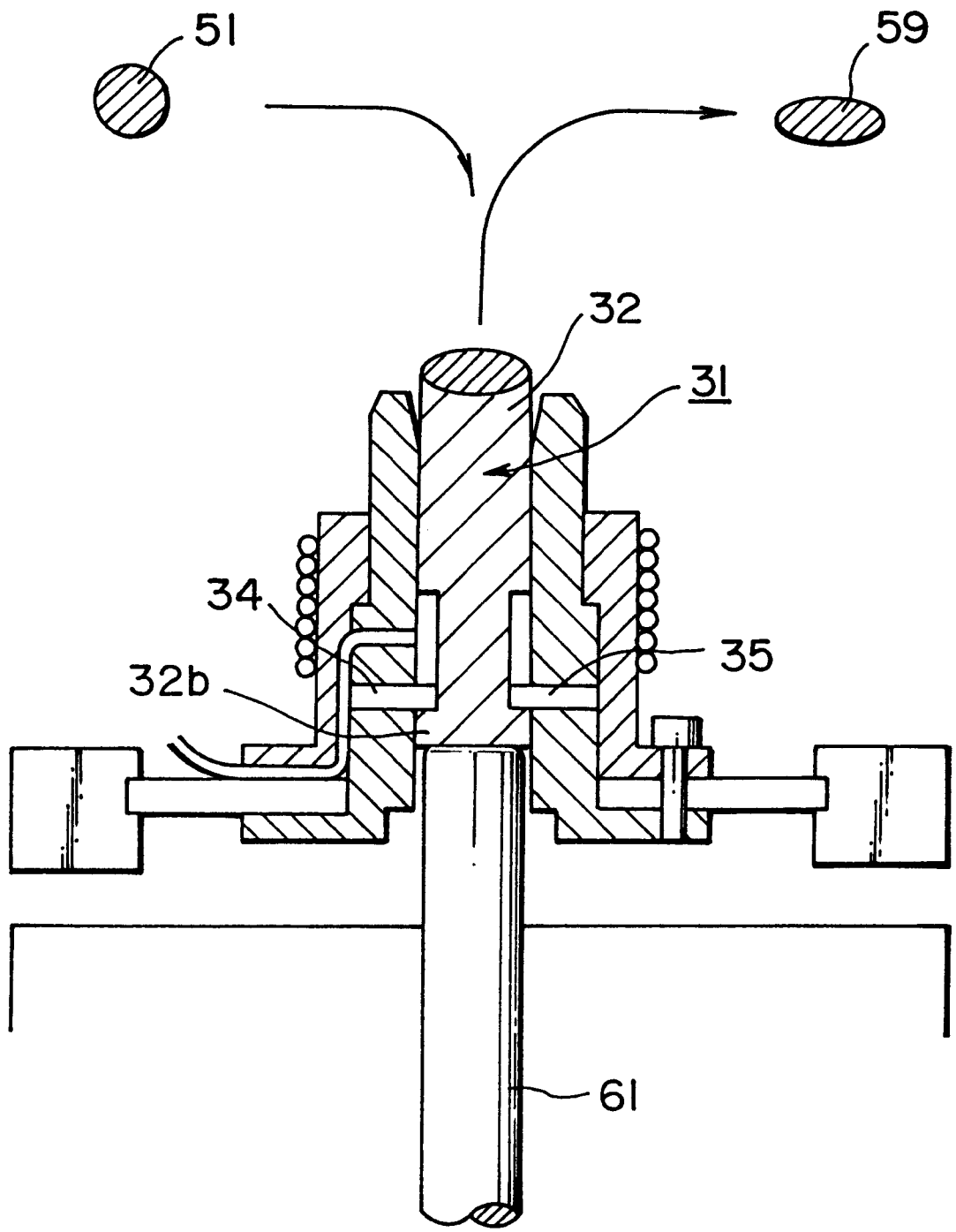
FIG. 16 is a cross-sectional view illustrating placement of the preform and removal of the molding from the glass compression molding machine according to the third embodiment of the present invention.

FIG. 16 illustrates transfer of a preform to and from the glass compression molding machine according to the third embodiment of the present invention. When the upper platen (omitted from illustration) has been moved upwards and, accordingly, the dies have been opened, the upper molding die 11 (see FIG. 11) and the lower molding die 31 are moved to the preform-injecting/molding-ejecting station. The preform-injecting/molding-ejecting station is provided with a projection rod 61 for pushing the lower core 32 upward to provide easy access for a robot (omitted from illustration) to introduce the preform 51 and remove the molding 59. The lower core 32 is moved upwards by the projection rod 61, until the upward movement of the lower core 32 is stopped by the flange portion 32b formed at the lower end of the lower core 32 coming into contact with the semicircular rings 34 and 35. Then, the robot removes the molding 59 from the lower molding die 31, followed by placement of the next preform 51 for the next molding cycle.

The surfaces of the upper core 12 and the lower core 32 are covered with thin films to prevent the adhesion of molten glass. However, the thin films are frequently exposed to the temperature higher than 300° C., and accordingly, the thin films tend to become oxidized as the molding operation is repeated, reducing the durability of the molding die assembly. To prevent such oxidation the present invention supplies nitrogen gas to the space between the upper molding die 11 and the lower molding die 31 in the clamping/heating/compressing station, thus improving the durability of the molding die assembly.

Figure 17:
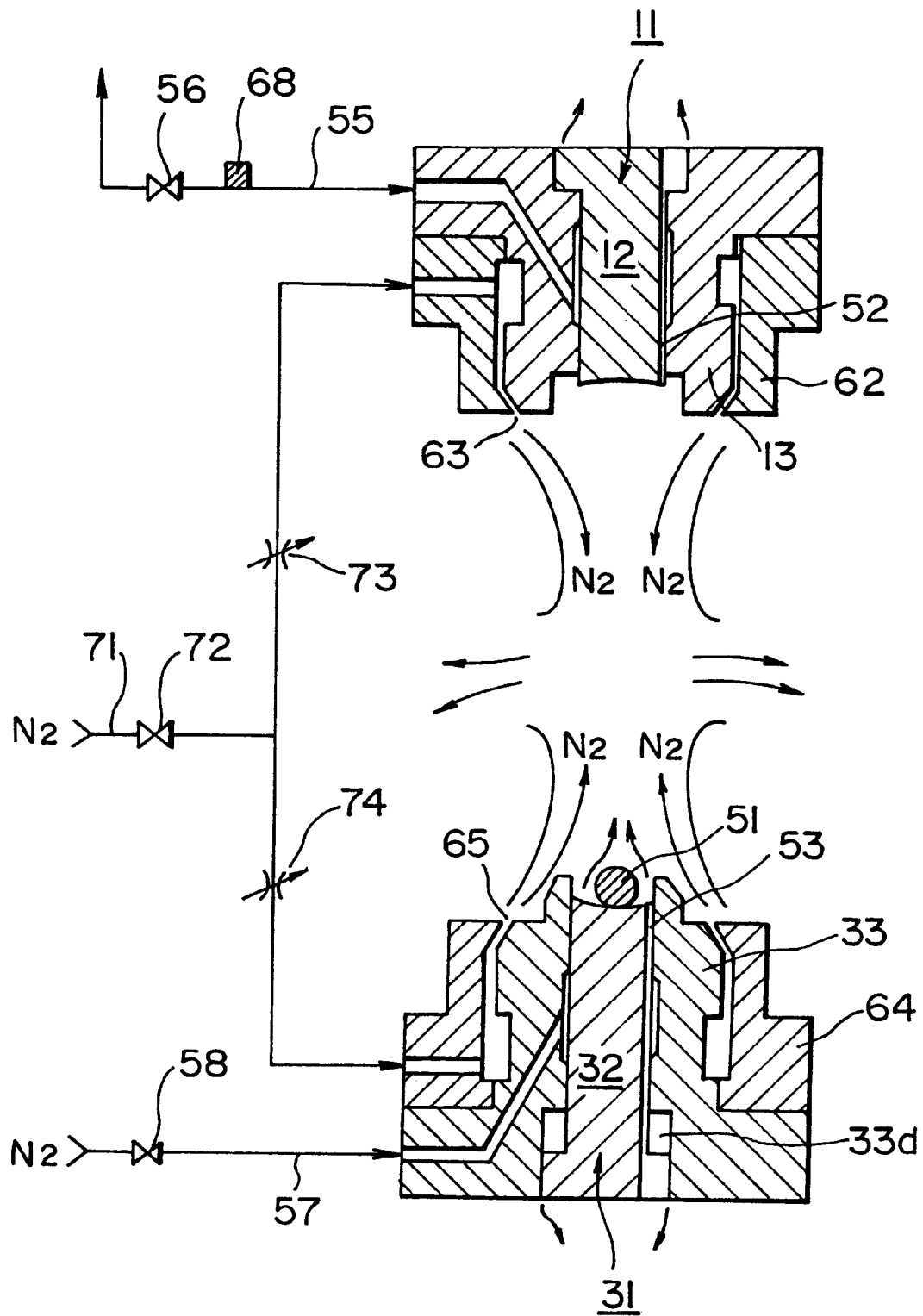
FIG. 17 is a cross-sectional view of a glass compression molding machine according to a fourth embodiment of the present invention.

A fourth embodiment of the present invention will now be described with reference to FIG. 17, which is a cross sectional view of a glass compression molding machine according to the fourth embodiment of the present invention, and wherein reference numeral 11 represents an upper molding die. The upper molding die 11 includes an upper core 12 and an upper cylinder 13 that surrounds the upper core 12. The upper core 12 is supported by the upper cylinder 13 and has a lower surface of a shape corresponding to the molding 8 (see FIG. 8). An upper nozzle ring 62 is disposed around the upper molding die 11 to define an annular nozzle 63 for forming a jet of inactive gas, for example, nitrogen gas.

The annular nozzle 63 is tapered to make the jet of nitrogen gas a conical shape. The vertical angle of the conical flow of the nitrogen gas is made to be 60°. The gap of the annular nozzle 63 is about 1 mm at the outlet, about 5 mm in the nozzle land portion, and about 5 mm at the junction with an annular header which forms a reservoir acting to equalize the flow from the annular nozzle 63. The gap of the annular nozzle 63 is supplied with the nitrogen gas via a nitrogen-gas injection valve 72 and a throttle valve 73 provided on a line 71.

Further, the upper core 12 has a slit 52 of about 50 to 100 $\mu$, while an annular gap of about 5 $\mu$ is formed between the upper core 12 and the upper cylinder 13. The slit 52 is connected to a line 55 for communication with a vacuum pump (omitted from illustration), for example, a rotary pump, via an exhaust valve 56. The line 55 is provided with an oxygen concentration meter 68. The vacuum established with the vacuum pump may be omitted.

The lower molding die 31 includes a lower core 32 and a lower cylinder 33 that surrounds the lower core 32. The top surface of the lower core 32 has a shape that corresponds to the molding. The lower cylinder 33 has a large-diameter bore 33d at the lower end thereof, of a depth which defines a predetermined stroke for the lower core 32. The lower molding die 31 has a lower nozzle ring 64, forming an outer surface portion thereof, which defines an annular nozzle 65 for forming a jet of nitrogen gas in cooperation with the leading end portion of the lower cylinder 33. The annular nozzle 65 is supplied with nitrogen gas via a nitrogen-gas injection valve 72 and a throttle valve 74 provided in the line 71.

The annular nozzle 65 is tapered to make the flow of nitrogen gas a conical shape. The vertical angle of the conical flow of the nitrogen gas is made to be 60°. The gap of the annular nozzle 65 is about 1 mm at the outlet, about 5 mm in the nozzle land portion, and about 5 at the junction with an annular header which forms a reservoir acting to equalize flow from the annular nozzle 65.

Further, the lower core 32 has a slit 53 of about 50 to 100 $\mu$, while an annular gap (omitted from illustration) of about 5 $\mu$ is formed between the lower core 32 and the lower cylinder 33. The slit 53 is connected to a line 57 for communication with a nitrogen-gas cylinder (omitted from illustration) or the like via a nitrogen-gas injection valve 58.

The operation of a fourth embodiment of the present invention will now be described.

Figure 18:
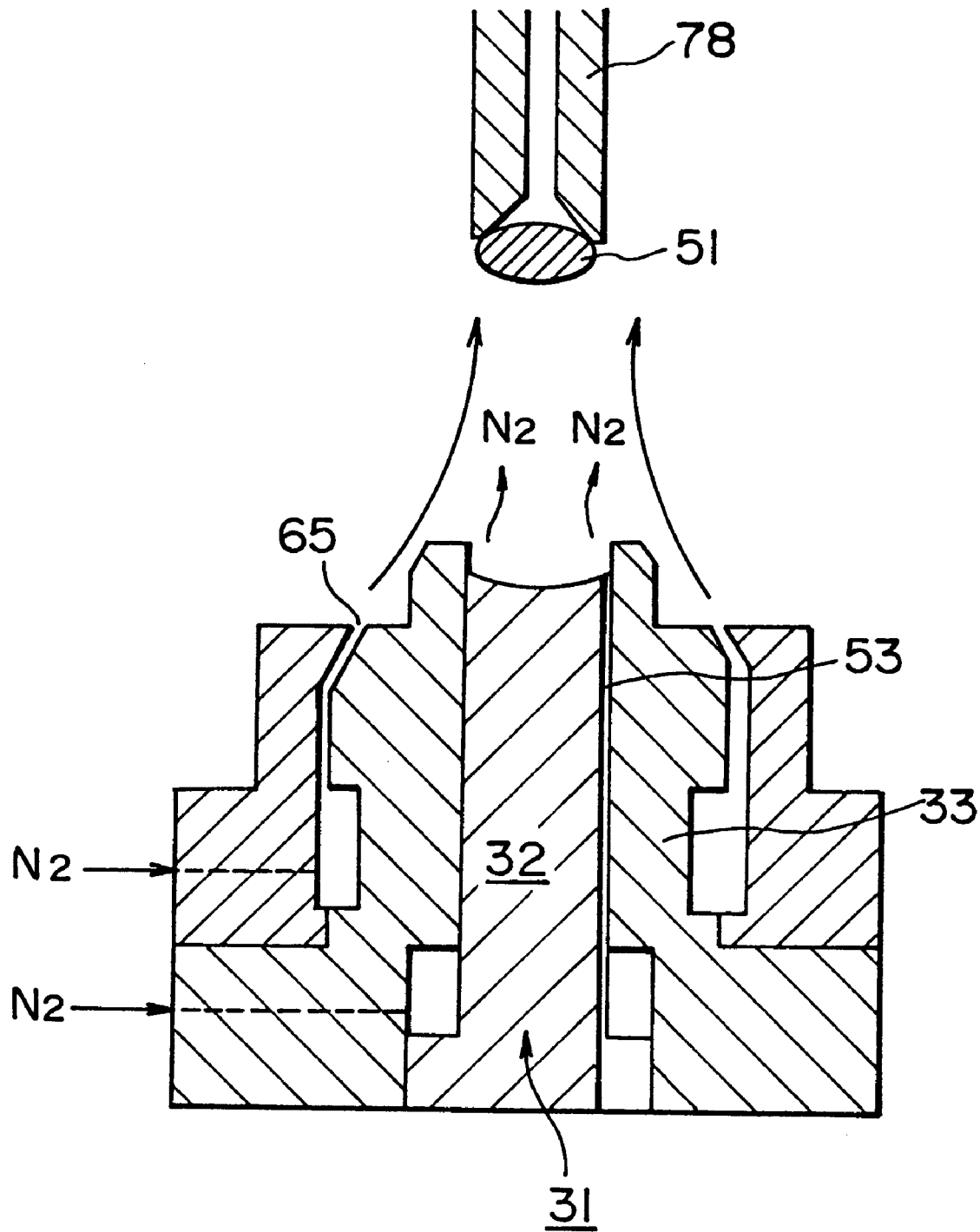
FIG. 18 is a cross-sectional view illustrating placement of a preform into the glass compression molding machine according to the fourth embodiment of the present invention.
Figure 19:
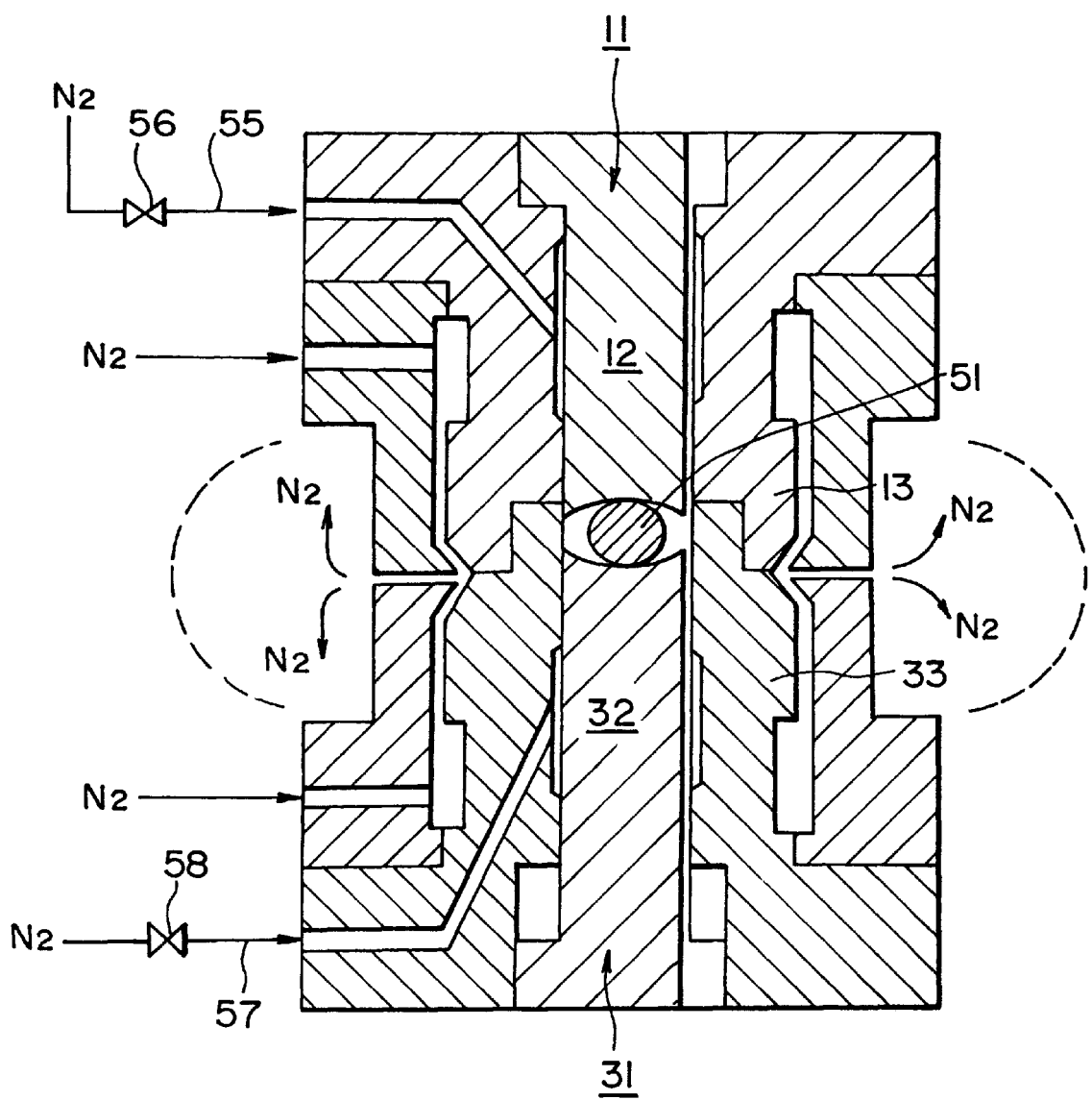
FIG. 19 is a cross-sectional view illustrating the closed state of the dies of the glass compression molding machine according to the fourth embodiment of the present invention.
Figure 20:
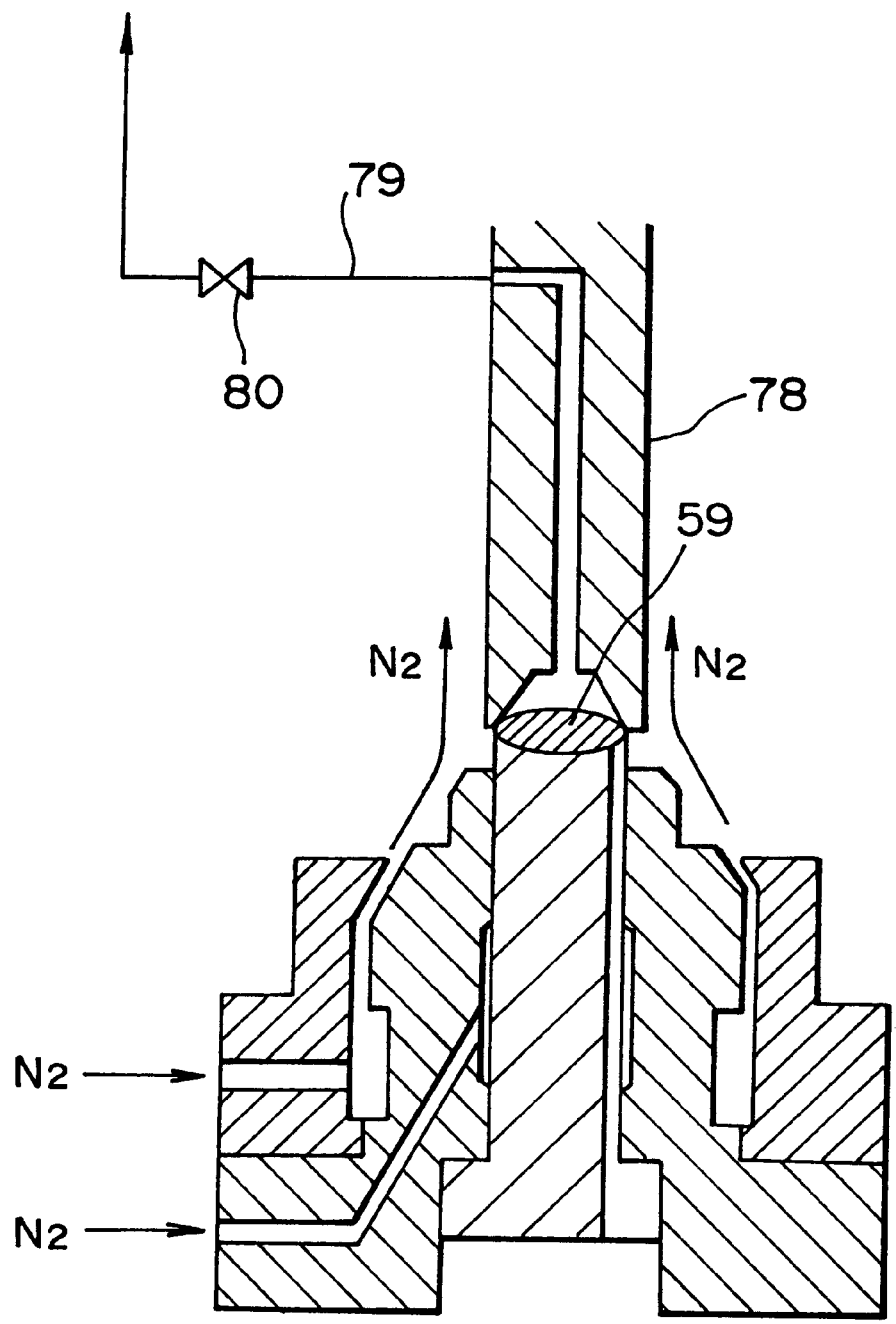
FIG. 20 is a cross-sectional view illustrating removal of a molding from the glass compression molding machine according to the fourth embodiment of the present invention.

FIG. 18 illustrates placement of a preform into the glass compression molding machine according to the fourth embodiment of the present invention. FIG. 19 illustrates the positions of the dies of the glass compression molding machine according to a fourth embodiment of the present invention when closed. FIG. 20 illustrates removal of a molding from the glass compression molding machine according to the fourth embodiment of the present invention.

The upper molding die 11 (see FIG. 17) and the lower molding die 31 are preheated to 350 to 650° C., and the preform 51 is preheated to 300 to 600° C. Then, the preform 51 is placed in the lower molding die 31 by a vacuum holder 78 of a robot (omitted from illustration). During this operation, nitrogen gas, that is continuously emitted from the annular nozzle 65, forms a conical barrier of nitrogen gas. Nitrogen gas is continuously emitted from the annular gap between the lower core 32 and the lower cylinder 33 as well as from the slit 53.

The vacuum holder 78 passes through the barrier of nitrogen gas to access the lower molding die 31 to place the preform 51 into the lower molding die 31, as illustrated in FIG. 18.

The lower molding die 31, into which the preform 51 has been placed, is coupled with the upper molding die 11 as shown in FIG. 19 to close the dies 11 and 31. After closing, the exhaust valve 56 on the line 55 is opened to evacuate gas from the space defined by the upper cylinder 13, the lower cylinder 33, the upper core 12 and the lower core 32.

A small gap is formed along the parting line, at the juncture between the upper cylinder 13 and the lower cylinder 33 and between the upper core 12 and the lower core 32. As a result, an atmosphere of nitrogen gas is formed around the upper cylinder 13 and the lower cylinder 33. Further, nitrogen gas is supplied, via the line 57, to the space surrounded by the upper cylinder 13, the lower cylinder 33, the upper core 12 and the lower core 32. Therefore, when evacuating via the line 55, that space is completely purged by nitrogen gas. Hence, air undesirably introduced at the time of introduction of the preform 51 is removed.

The vacuum is maintained for several seconds, and then stopped. Since the space surrounded by the upper drum 13, the lower drum 33, the upper core 12 and the lower core 32 is continuously pressurized with nitrogen gas, no air can be introduced into the space. The nitrogen-gas injection valve 58 on the line 57 is closed until the opening to conserve nitrogen gas, and opened again just before the dies are opened. Therefore, an atmosphere of nitrogen gas is formed in the space surrounded by the upper cylinder 13, the lower cylinder 33, the upper core 12 and the lower core 32 while the dies are opened.

After the dies have been fully opened, the molding 59 is removed by the vacuum holder 78 of a robot (omitted from illustration) as shown in FIG. 20. Reference numeral 79 represents a line for connecting the vacuum holder 78 to a rotary pump (omitted from illustration), the line 79 having a valve 80 disposed therein.

Figure 21:
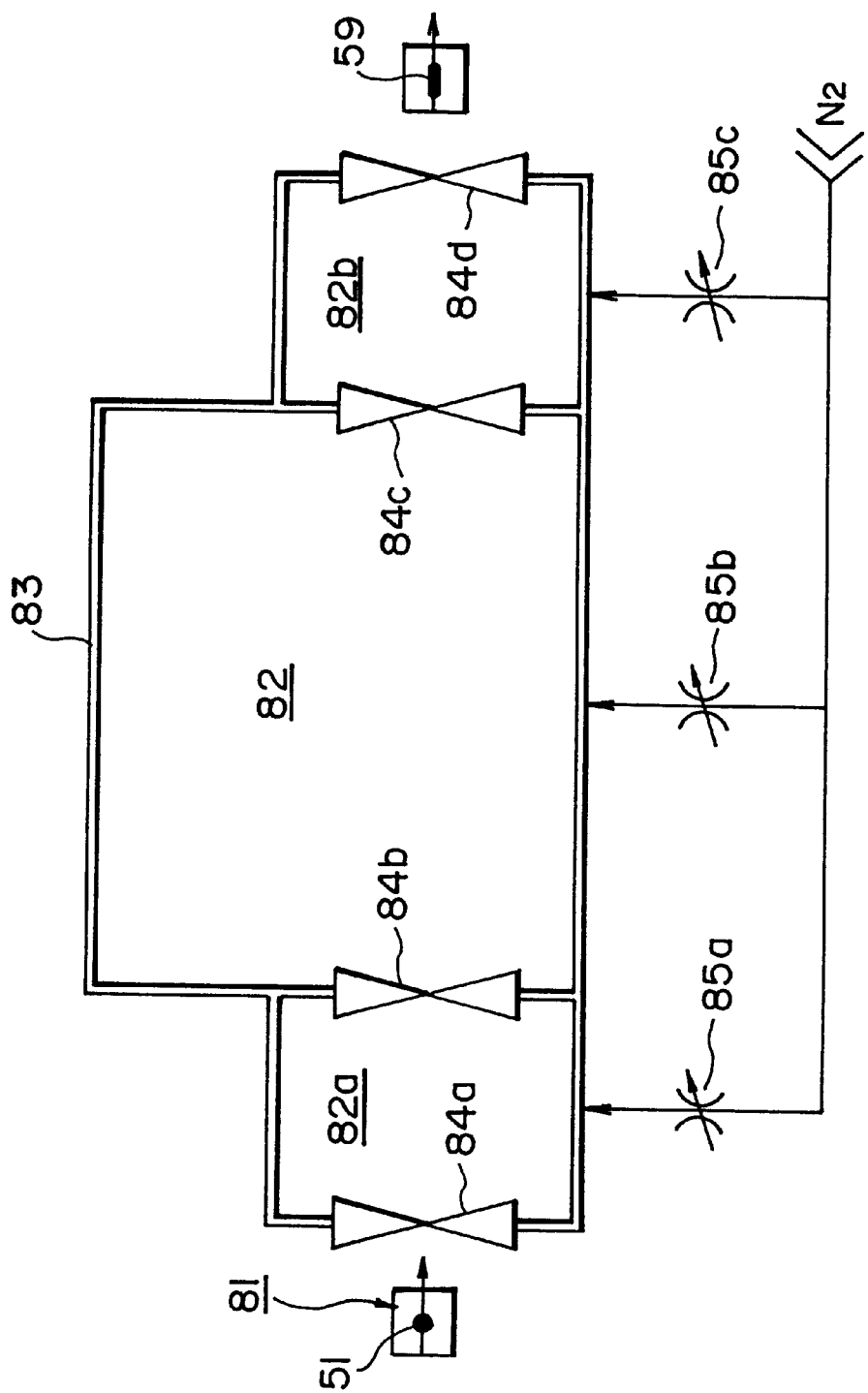
FIG. 21 is a schematic view of a molding chamber in which an atmosphere of nitrogen gas is formed.

Although the third and the fourth embodiments prevent the oxidation of the films applied to the upper core 12 and the lower core 32, by supplying nitrogen gas to the space between the upper core 12 and the lower core 32, it might be considered feasible to further prevent the oxidation of the thin films by enclosing clamping/heating/compressing station within a closed machining chamber containing an atmosphere of nitrogen gas. FIG. 21 is a schematic view of such a machining chamber in which such an atmosphere of nitrogen gas is formed, in which reference numeral 51 represents a preform, 59 represents a molding, and 81 represents a molding die assembly. Reference numeral 82 represents a machining chamber in which the clamping/heating/compressing station is formed, 82a represents a front chamber, 82b represents a rear chamber, and 83 represents a casing for sectioning and forming the foregoing machining chamber 82, the front chamber 82a and the rear chamber 82b.

A partition door 84a is disposed between the ambient atmosphere and the front chamber 82a, a partition door 84b is disposed between the front chamber 82a and the machining chamber 82, a partition door 84c is disposed between the machining chamber 82 and the rear chamber 82b, and a partition door 84d is disposed between the rear chamber 82b and the ambient atmosphere.

The front chamber 82a, the machining chamber 82 and the rear chamber 82b can be supplied with nitrogen gas, with the front chamber 82a, the machining chamber 82 and the rear chamber 82b being respectively provided with throttle valves 85a to 85c for adjusting the quantity of nitrogen gas supplied.

Since the molding die assembly 81 is conveyed with its dies coupled in the foregoing case, the size of each of the foregoing partition doors 84a to 84d cannot be reduced satisfactorily. Therefore, mixing will occur between the ambient atmosphere and the atmosphere within the front chamber 82a, between the front chamber 82a and the machining chamber 82, between the machining chamber 82 and the rear chamber 82b, and between the rear chamber 82b and the ambient atmosphere, causing the concentration of oxygen to be raised If a cover (omitted from illustration) of the machining chamber 82 is temporarily removed to perform maintenance, the concentration of oxygen is raised, and, accordingly, several hours are required to lower the concentration of oxygen to a predetermined level.

Accordingly, the concentration of oxygen around the molding die assembly 81 can be lowered to 1000 ppm or lower in a short time to prevent a rise in the concentration of oxygen at the time of injecting the preform 51 or ejecting the molding 59.

Figure 22:
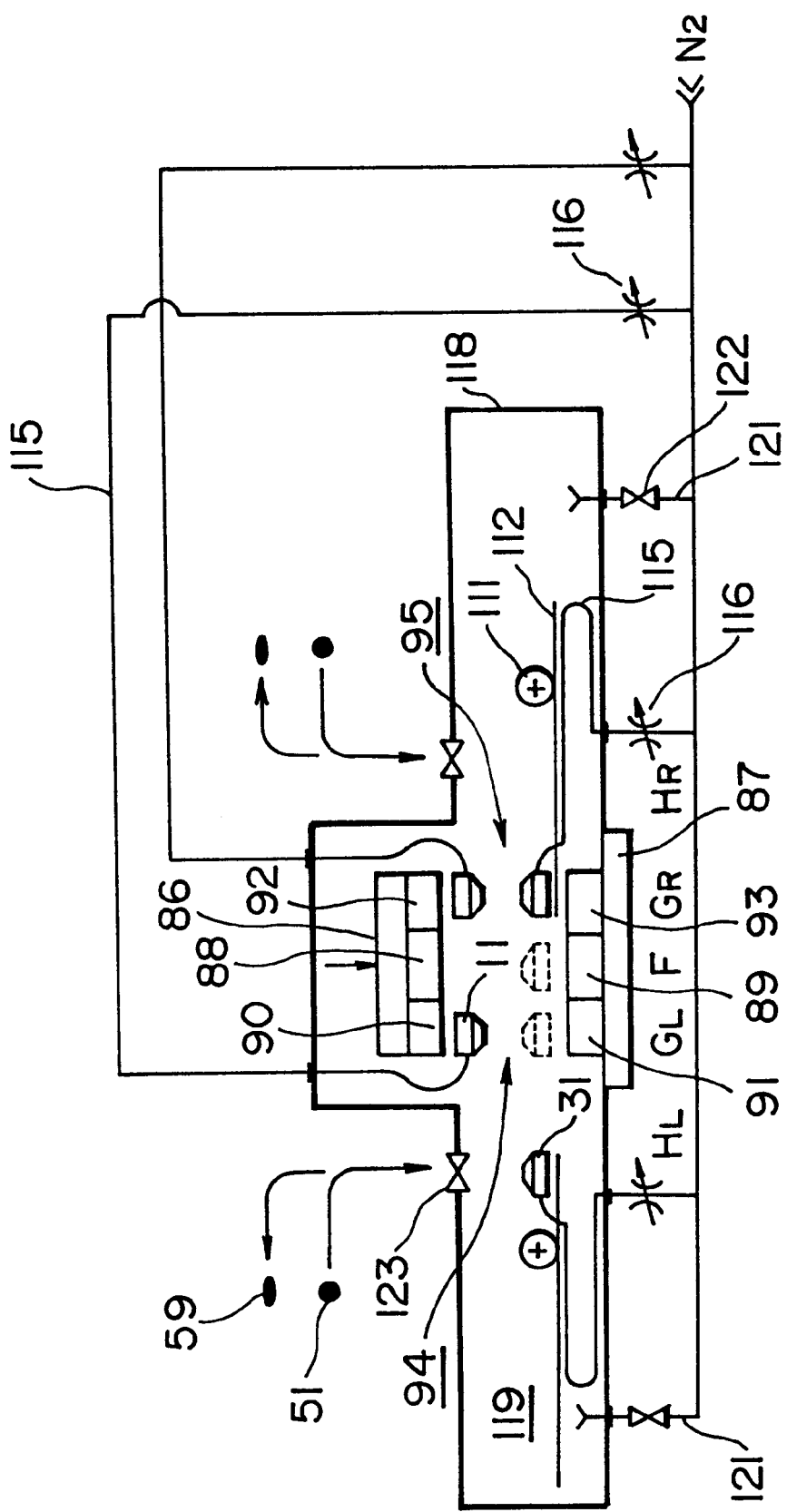
FIG. 22 is a schematic view of a machining chamber of the glass compression molding apparatus according to a fifth embodiment of the present invention.

A fifth embodiment of the present invention will now be described with reference to FIG. 22, which is a schematic view of the entire fifth embodiment, FIG. 23, which is an enlarged view of an essential portion thereof, and FIG. 24, which is a plan view of a preform-injecting/molding-ejecting station according to the fifth embodiment.

Referring to the drawings, reference numeral 86 represents an upper platen, 87 represents a lower platen, symbol F represents a clamping/heating/compressing station disposed on the lower platen 87, $G_L$ represents a left gradual-cooling station disposed adjacent to the clamping/heating/compressing station F, $G_R$ represents a right gradual-cooling station disposed adjacent to the clamping/heating/compressing station F, $H_L$ represents a left preform-injecting/molding-ejecting station, and $H_R$ represents a right preform-injecting/molding-ejecting station.

A clamping device (omitted from illustration) is disposed above the upper platen 86 to move the upper platen 86 downward to generate clamping force and to withdraw it upward.

In the clamping/heating/compressing station F, an upper heating plate 88 is provided for the upper platen 86 and a lower heating plate 89 is provided for the lower platen 87. In the left gradual-cooling station $G_L$, a left gradual-cooling upper heating plate 90 is provided for the upper platen 86, and a left gradual-cooling lower heating plate 91 is provided for the lower platen 87. In the right gradual-cooling station $G_R$, a right gradual-cooling upper heating plate 92 is provided for the upper platen 86, and a right gradual-cooling lower heating plate 93 is provided for the lower platen 87.

Each of the upper heating plate 88, the lower heating plate 89, the left gradual-cooling upper heating plate 90, the left gradual-cooling lower heating plate 91, the right gradual-cooling upper heating plate 92 and the right gradual-cooling lower heating plate 93 is a cartridge heater that is controlled to maintain the temperature at a level required to perform the molding. That is, the high-temperature upper heating plate 88 and the high-temperature lower heating plate 89 are set to a temperature higher than the glass transition point $T_g$ of the glass material to be molded, while the left gradual-cooling upper heating plate 90 and the right gradual-cooling upper heating plate 92 are set to a temperature lower than the glass transition point $T_g$. The difference between the two temperature levels is about 100° C.

A left molding die 94 and a right molding die 95 are disposed for movement along the upper platen 86 and the lower platen 87. A pair of the left molding dies 94 and a pair of the right molding dies 95 are provided at each of the front and the back of the glass compression molding machine to provide a twin-molding-type glass compression molding machine.

Both the left molding die 94 and the right molding die 95 has an upper molding die 11 and a lower molding die 31. The upper molding die 11 and the lower molding die 31 are allowed to close and separate from each other with the parting line as the boundary. The upper molding die 11 comprises an upper core 12, an upper cylinder 13 that surrounds the upper core 12, an electromagnetic induction coil 97 that surrounds the upper cylinder 13, and an annular upper nozzle plate 98 fastened to the lower end of the electromagnetic induction coil 97. The upper nozzle plate 98 is secured to an upper molding-die fastening plate 100 by a bolt 99 or the like to hold the upper cylinder 13 and the electromagnetic induction coil 97.

The upper core 12 has a lower surface with a shape that corresponds to the molding 59, and is supported by the upper cylinder 13. The upper molding-die fastening plate 100 is commonly employed as an integral support for all of the upper molding dies 11.

A pair of L-shape rails (omitted from illustration) projecting downwards are provided on the lower surface of the left gradual-cooling upper heating plate 90 and the right gradual-cooling upper heating plate 92. The upper molding-die fastening plate 100 can be freely moved along these rails in the left gradual-cooling station $G_L$ and the right gradual-cooling station $G_R$, to position the upper molding die 11.

Each of the lower molding dies 31 includes a lower core 32, a lower cylinder 33 that surrounds the lower core 32, an electromagnetic induction coil 102 that surrounds the lower cylinder 33, and a lower nozzle plate 103 fastened to the top end of the electromagnetic induction coil 102. The lower nozzle plate 103 is secured to a lower molding-die fastening plate 105 by a bolt 104 or the like to hold the lower cylinder 33 and the electromagnetic induction coil 102.

The lower core 32 has a top surface with a shape that corresponds to the molding 59, and is supported by the lower cylinder 33 by a pin 108. In contrast to the arrangement wherein the upper core 12 is fixed to the upper cylinder 13, the lower core 32 is able to slidably move with respect to the lower cylinder 33. In order to achieve this, the pin 108 penetrates the lower cylinder 33 horizontally. On the other hand, an elongated through hole 109 for the pin 108 is horizontally formed in the lower core 32. Although the lower core 32 is usually supported by the lower cylinder 33 through the pin 108, the lower core 32 can be pushed upwards by the length of the elongated through hole 109.

The lower molding-die fastening plate 105 is commonly employed as an integral support for all of the lower molding dies 31.

The lower molding die 31 can be moved among the left preform-injecting/molding-ejecting station $H_L$, the left gradual-cooling station $G_L$, the clamping/heating/compressing station F, the right gradual-cooling station $G_R$, and the right preform-injecting/molding-ejecting station $H_R$. In order to move the lower molding die 31, molding-die conveyance devices 111 are disposed to the left and to the right of the glass compression molding machine. Each molding-die conveyance device 111 has a pair of supporting rods 112 capable of moving forward/rearward with respect to the lower molding die 31.

The lower-molding-die fastening plate 105 is secured to the leading ends of the supporting rods 112. Therefore, the molding-die conveyance device 111 supports and moves the lower molding die 31 among the left preform-injecting/molding-ejecting station $H_L$, the left gradual-cooling station $G_L$, the clamping/heating/compressing station F, the right gradual-cooling station $G_R$, and the right preform-injecting/molding-ejecting station $H_R$.

In order to generate clamping force, a clamping device is disposed above the upper platen 86 to move the upper platen 86 downward in the left gradual-cooling station $G_L$ or the right gradual-cooling station $G_R$ and to align the upper cylinder 33 with the lower cylinder 33 in the manner previously described. As a result, an intermediate stop position can be formed temporarily.

A clamping device (omitted from illustration) is also disposed below the clamping/heating/compressing station F to push the lower core 32 upward. As a result, the preform 51 is compressed to form the molding 59.

The annular upper nozzle plate 98 is fastened to the lower end of the electromagnetic induction coil 97 as described above so that nitrogen gas of high purity is emitted from the annular nozzle 101 formed between the upper nozzle plate 98 and the upper cylinder 13 into the space between the upper molding die 11 and the lower molding die 31.

The annular lower nozzle plate 103 is fastened to the top end of the electromagnetic induction coil 102 as described above so that nitrogen gas of high purity is emitted from the annular nozzle 106 formed between the lower nozzle plate 103 and the lower cylinder 33 into the space between the upper molding die 11 and the lower molding die 31.

The annular nozzles 101 and 106 are supplied with nitrogen gas via stainless steel lines 115, the flow of nitrogen gas being adjusted by a throttle valve 116. Since nitrogen gas is supplied to the space between the upper molding die 11 and the lower molding die 31 as described above, the thin films formed on the surfaces of the upper core 12 and the lower core 32 are not oxidized and the durability of the molding die assembly is improved.

The upper platen 86, the upper heating plate 88, the lower heating plate 89, the left gradual-cooling upper heating plate 90, the left gradual-cooling lower heating plate 91, the right gradual-cooling upper heating plate 92, the right gradual-cooling lower heating plate 93, and the molding-die conveyance device 111 and the like are all sealed within a casing 118 defining a machining chamber 119.

The machining chamber 119 contains an atmosphere of nitrogen gas. Nitrogen gas is supplied via the line 115 and the annular nozzles 101 and 106 and is directly supplied into the machining chamber 119 via a line 121. The line 121 is provided with an electromagnetic valve 122 to control the flow of nitrogen gas.

Figure 23:
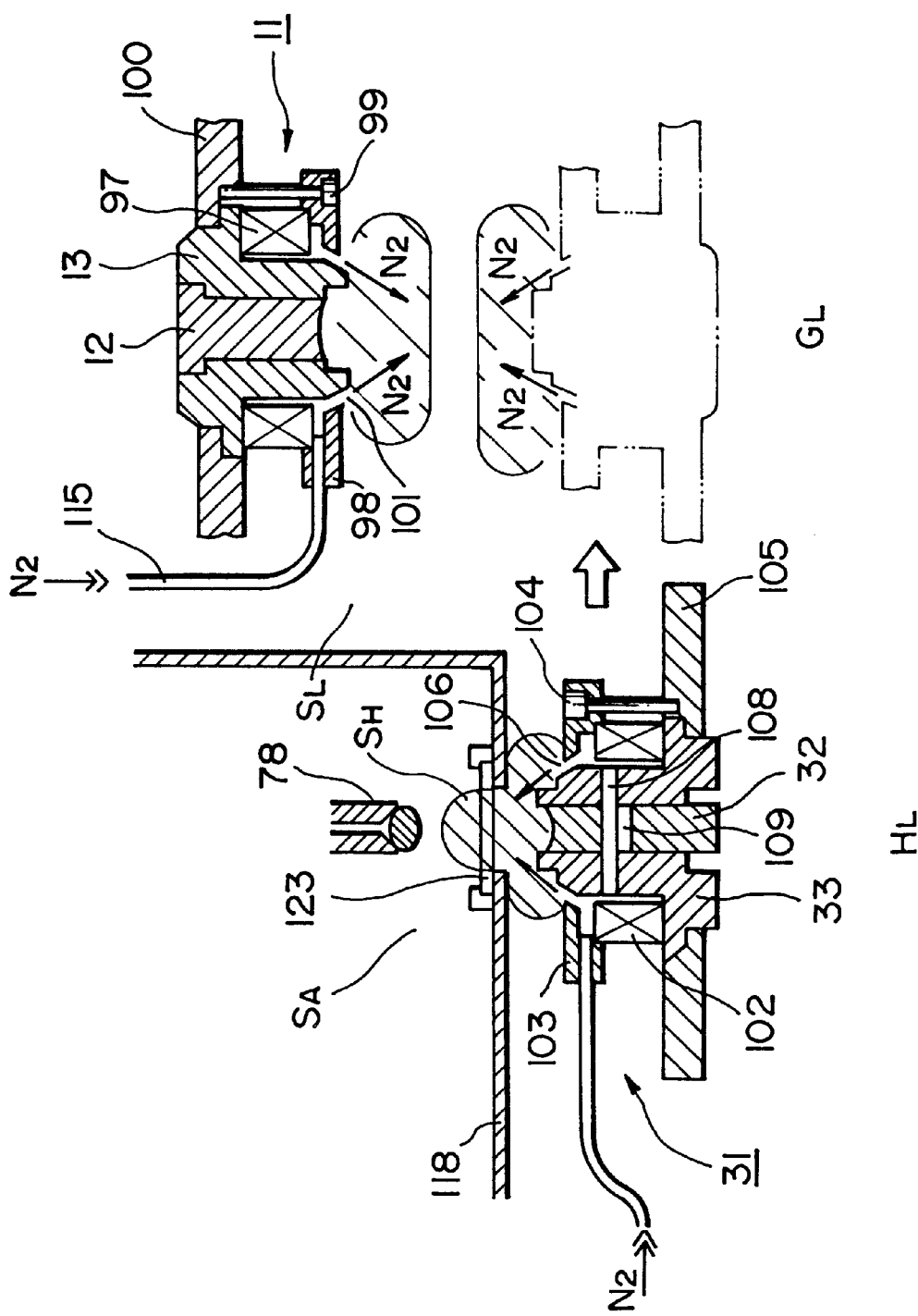
FIG. 23 is an enlarged cross-sectional view of an essential portion of the fifth embodiment of the present invention.
Figure 24:
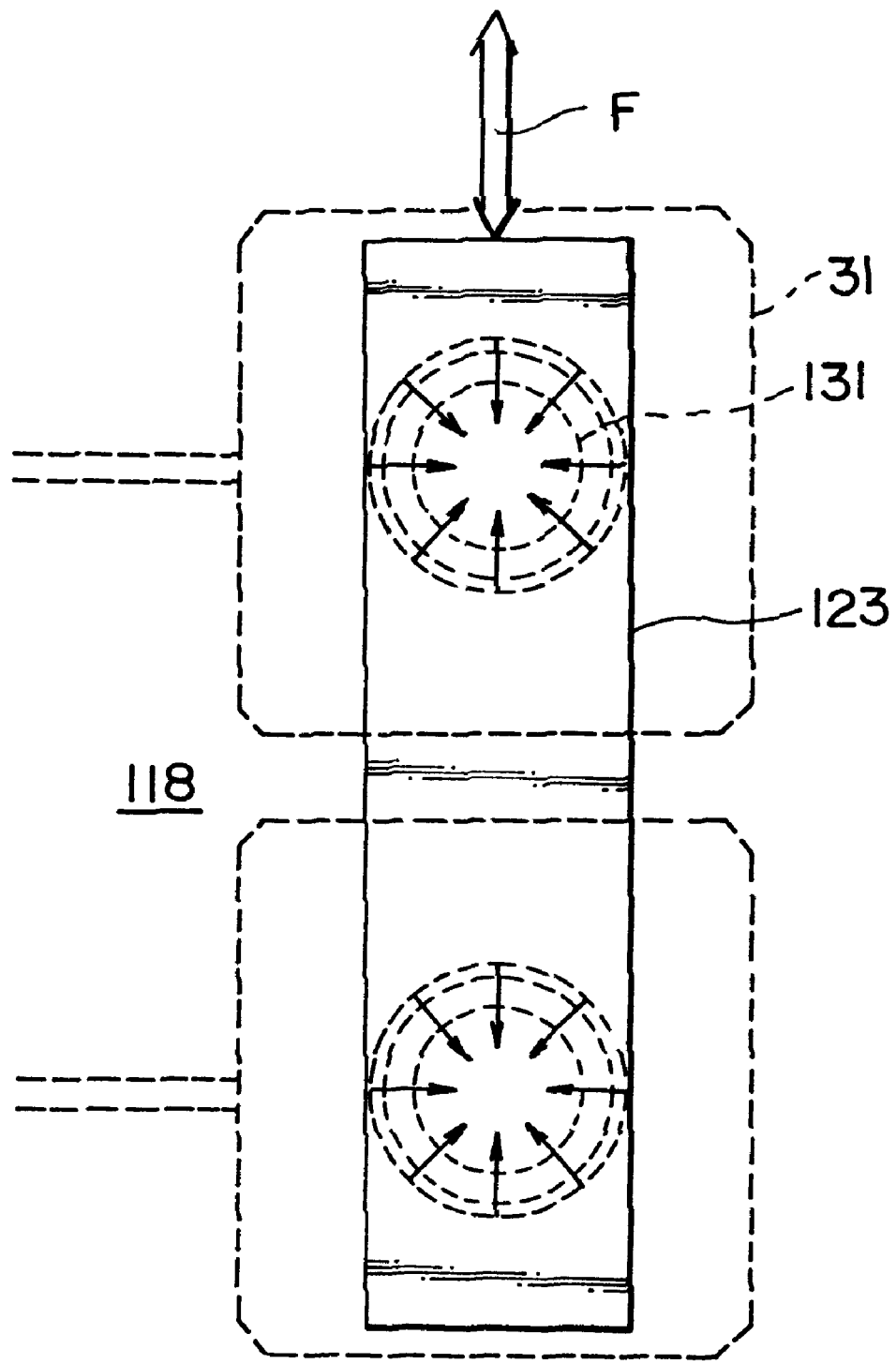
FIG. 24 is a plan view of a preform-injecting/molding-ejecting station according to the fifth embodiment of the present invention.

As a result, a high level area $S_H$, in which the concentration of oxygen is low (for example 100 to 1000 ppm=0.01 to 0.1), is created adjacent to the annular nozzles 101 and 106 in the machining chamber 119, and low level non-oxygen areas $S_L$, in which the concentration of oxygen is high (for example 1 to 0.1), are created in the other portions of the machining chamber 119 as shown in FIG. 23. Symbol $S_A$ represents an atmospheric area in which the concentration of oxygen is 21%.

A portion of the casing 118 that corresponds to the left preform-injecting/molding-ejecting station $H_L$ and a portion of the same that corresponds to the right preform-injecting/molding-ejecting station $H_R$, for example, the ceiling portion of the casing 118 above the left preform-injecting/molding-ejecting station $H_L$ and that above the right preform-injecting/molding-ejecting station $H_R$, are provided with a shutter 123. The shutter 123 is opened only when the preform 51 is introduced or the molding 59 is removed. Therefore, the casing 118 has a hole 131, the diameter of which is slightly larger than that of the vacuum holder 78 of a robot (omitted from illustration). The hole 131 can be opened/closed by moving the shutter 123 in the direction designated by an arrow F shown in FIG. 24.

Since the pressure in the casing 118 is higher than that of the ambient atmosphere, the ambient atmosphere does not enter the casing 118 through the hole 131 at the time of opening the shutter 123. Therefore, even if the shutter 123 is opened, the concentration of oxygen in the high level non-oxygen area $S_H$ is not raised.

The electromagnetic valve 122 in the line 121 and the throttle valve 116 in the line 115 are opened prior to the commencement of molding to introduce nitrogen gas. After a predetermined time has passed, the electromagnetic valve 122 is closed. The electromagnetic valve 122 is used at the time of commencing the operation and is capable of supplying a large quantity (for example, about 10 to 20 l/min) of nitrogen gas. On the other hand, the throttle valve 116 is always slightly open to supply a small quantity (for example, about 0.5 to 1 l/min per each of the annular nozzles 101 and 106) of nitrogen gas.

Although the invention has been described in its preferred form with a certain degree of particularity, it is understood that the preferred embodiments can be changed in the details of construction and in the combination and arrangement of parts without departing from the spirit and the scope of the invention.

What we claim is:

1. A glass compression molding apparatus comprising:
   (a) an upper heating plate;
   (b) an upper molding die including an upper flange portion for contact with said upper heating plate and, depending from said upper flange portion, an upper cylindrical portion which has a lower annular surface surrounding an upper cylindrical core, said upper cylindrical core having a lower endface with one of a pair of mating molding surfaces formed in and coextensive with said lower endface;
   (c) a lower heating plate for, in cooperation with said upper heating plate, heating a glass preform to a temperature suitable for molding;
   (d) a lower molding die forming a molding die assembly with said upper molding die, and including:
      (i) a lower hollow cylinder defining an interior bore of constant diameter which receives said upper cylindrical core with a mating fit, and having an upper annular surface for forming a mating fit with said lower annular surface;
      (ii) a lower flange, for contact with said lower heating plate, depending from a lower end of said lower hollow cylinder, opposite said upper annular surface; and
      (iii) a lower core which is slidably mounted in said interior bore for reciprocating movement relative to said hollow cylinder and said upper molding die, said lower core having an upper endface defining the other of said pair of mating molding surfaces;
   (e) clamping means for clamping together said upper molding die and said lower hollow cylinder to fix the position of said upper cylindrical core within said interior bore of said lower cylinder; and
   (f) compression means, operable independently of said clamping means, for driving said lower core upward within said interior bore, relative to the clamped upper molding die and lower cylinder, thereby generating compressive force between said pair of mating molding surfaces.

2. A glass compression molding apparatus according to claim 1, wherein said lower hollow cylinder of said lower molding die is aligned with said upper cylindrical core by said mating fit.

3. A glass compression molding apparatus according to claim 1, wherein said upper molding die further includes:

an upper hollow cylinder, and wherein said upper cylindrical core is slidably mounted in said upper hollow cylinder, and wherein said lower hollow cylinder of said lower molding die is aligned with said upper cylinder of said upper molding die by said mating fit.

4. A glass compression molding apparatus according to claim 1, comprising a plurality of sets of paired said upper and lower molding dies and said compression means, each of said compression means independently generating a compressive force.

5. A glass compression molding apparatus according to claim 1 further comprising means for supplying inactive gas to a region between said upper molding die and said lower molding die.

6. A glass compression molding apparatus according to claim 5, wherein said upper molding die further comprises an upper hollow cylinder, and said upper cylindrical core is slidably mounted in said upper hollow cylinder and wherein said inactive gas is supplied through a notch formed between the core and the cylinder of at least one of said upper and lower molding dies.

7. A glass compression molding apparatus according to claim 5 further comprising a nozzle ring that surrounds said lower hollow cylinder and wherein said means for supplying inactive gas comprises a nozzle formed between said cylinder and said nozzle ring.

8. A glass compression molding apparatus according to claim 3 further comprising:

(a) temperature sensors embedded in said cylinders; and (b) heating means disposed on the outer surface of each of said cylinders and controlled in accordance with the temperatures detected by said temperature sensors.

9. A glass compression molding apparatus according to claim 1, wherein said upper flange portion, said upper cylindrical portion and said upper cylindrical core of said upper molding die are integral, being formed as a single piece.

10. A glass compression molding apparatus according to claim 9 wherein said lower hollow cylinder and said lower flange of said lower molding die are integral, being formed as a single piece.

11. A glass compression molding apparatus according to claim 1 wherein said lower hollow cylinder and said lower flange of said lower molding die are integral, being formed as a single piece.

12. A glass composition molding apparatus according to claim 1 further comprising:

upper and lower platens, said lower platen supporting said lower heating plate through at least one heat insulating element and said upper platen bearing against said upper heating plate through at least one heat insulating element.

13. A glass composition molding apparatus according to claim 1 further comprising:

upper and lower platens, said lower platen supporting at least first and second lower heating plates and said upper platen supporting at least first and second upper heating plates, said first upper and lower heating plates defining a first station between said platens for receiving said upper and lower molding dies and said second upper and lower heating plates defining a second station between said platens for receiving said upper and lower molding dies.

* * * * *